United States Patent
Sau et al.

(10) Patent No.: US 9,825,914 B2
(45) Date of Patent: Nov. 21, 2017

(54) SECURE NETWORK TUNNEL BETWEEN A COMPUTING DEVICE AND AN ENDPOINT

(71) Applicant: BlackBerry Limited, Waterloo (CA)

(72) Inventors: Jonathan Hong-Man Sau, Waterloo (CA); Graham Russell, Cambridge (CA); Bruno Richard Preiss, Waterloo (CA); Ronesh Puri, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 27 days.

(21) Appl. No.: 14/699,622

(22) Filed: Apr. 29, 2015

(65) Prior Publication Data

US 2015/0237009 A1 Aug. 20, 2015

Related U.S. Application Data

(63) Continuation of application No. 13/862,171, filed on Apr. 12, 2013, now Pat. No. 9,055,032.

(51) Int. Cl.
*H04L 29/06* (2006.01)
*H04L 29/08* (2006.01)

(52) U.S. Cl.
CPC ........ *H04L 63/029* (2013.01); *H04L 63/0428* (2013.01); *H04L 67/141* (2013.01)

(58) Field of Classification Search
CPC . H04L 2209/80; H04L 45/00; H04L 61/2514; H04L 61/2589; H04L 63/0272;
(Continued)

(56) References Cited

U.S. PATENT DOCUMENTS 6,349,336 B1 2/2002 Sit et al.
7,111,065 B2 9/2006 Davidson et al.
(Continued)

FOREIGN PATENT DOCUMENTS

| WO | WO 0150790 A1 * | 7/2001 | ......... H04L 12/5692 |
|---|---|---|---|
| WO | 2006012610 | 2/2006 | |
| WO | WO 2006012610 A2 * | 2/2006 | ........... H04L 1/1854 |

OTHER PUBLICATIONS

Partial European Search Report issued in EP Application No. 14160855.4, dated Jan. 27, 2015, 8 pages.
(Continued)

*Primary Examiner* — Kambiz Zand
*Assistant Examiner* — Abiy Getachew
(74) *Attorney, Agent, or Firm* — Fish & Richardson P.C.

(57) ABSTRACT

The present disclosure presents a system, method and apparatus herein enabling secure coupling of a computing device, such as a mobile device with an endpoint, such as an application server. The computing device can include any electronic device such as a computer, a server, an application server, a mobile device or tablet. The endpoint can be any electronic device as well that is located within an enterprise network. In at least one embodiment, the secure coupling of the mobile device with a computing device can include a security gateway server. In one example, the security gateway server can be a tunnel service server. In another embodiment, an application server can include a tunnel service module to provide the secure coupling with the mobile device.

21 Claims, 15 Drawing Sheets

(58) Field of Classification Search
CPC . H04L 63/029; H04L 63/0428; H04L 63/105; H04L 63/166; H04L 63/20; H04L 67/141; H04L 9/0844; H04W 12/06; H04W 12/08; H04W 76/02
USPC .......................................................... 713/151
See application file for complete search history.

(56) References Cited

U.S. PATENT DOCUMENTS

| | | | |
|---|---|---|---|
| 7,246,373 | B1 | 7/2007 | Leung et al. |
| 7,274,684 | B2 | 9/2007 | Young et al. |
| 7,536,720 | B2 | 5/2009 | Burdett et al. |
| 7,561,586 | B2 | 7/2009 | Wang et al. |
| 7,801,030 | B1 | 9/2010 | Aggarwal et al. |
| 7,961,725 | B2 | 6/2011 | Nagarajan et al. |
| 8,200,773 | B2 | 6/2012 | Bluestone et al. |
| 8,291,119 | B2 | 10/2012 | Rao et al. |
| 2003/0110288 | A1 | 6/2003 | Ramanujan et al. |
| 2006/0005240 | A1* | 1/2006 | Sundarrajan ........ H04L 63/0272 726/15 |
| 2007/0299954 | A1* | 12/2007 | Fatula ................. H04L 12/4641 709/223 |
| 2009/0034431 | A1* | 2/2009 | Nagarajan ........... H04L 12/4666 370/254 |
| 2010/0177786 | A1 | 7/2010 | Signaoff et al. |
| 2012/0051254 | A1 | 3/2012 | Paine et al. |
| 2012/0087235 | A1* | 4/2012 | Smith ................. H04L 41/0677 370/221 |
| 2012/0233678 | A1* | 9/2012 | Pal ........................ G06F 21/445 726/7 |

OTHER PUBLICATIONS

Extended European Search Report issued in European Application No. 14160855.4 dated Feb. 2, 2016; 15 pages.

* cited by examiner

SECURE NETWORK TUNNEL BETWEEN A COMPUTING DEVICE AND AN ENDPOINT

This application is a continuation application of U.S. application Ser. No. 13/862,171, filed on Apr. 12, 2013, the entire contents of which are hereby incorporated by reference.

FIELD

The present disclosure relates generally to providing a secure tunnel between a computing device and tunnel service server.

BACKGROUND

Mobile electronic devices can be configured to perform a wide range of tasks including accessing remote resources. A mobile device management service can be enabled to allow remote access, by the mobile electronic device, to corporate network resources and to manage the mobile electronic device. A virtual private network requires opening ports in a firewall to allow access through the firewall.

BRIEF DESCRIPTION OF THE DRAWINGS

A description is provided herein with reference to specific examples illustrated in the appended drawings. These drawings depict only example embodiments of the disclosure and are not intended to limit the scope of the disclosure.

DETAILED DESCRIPTION

Figure 1:
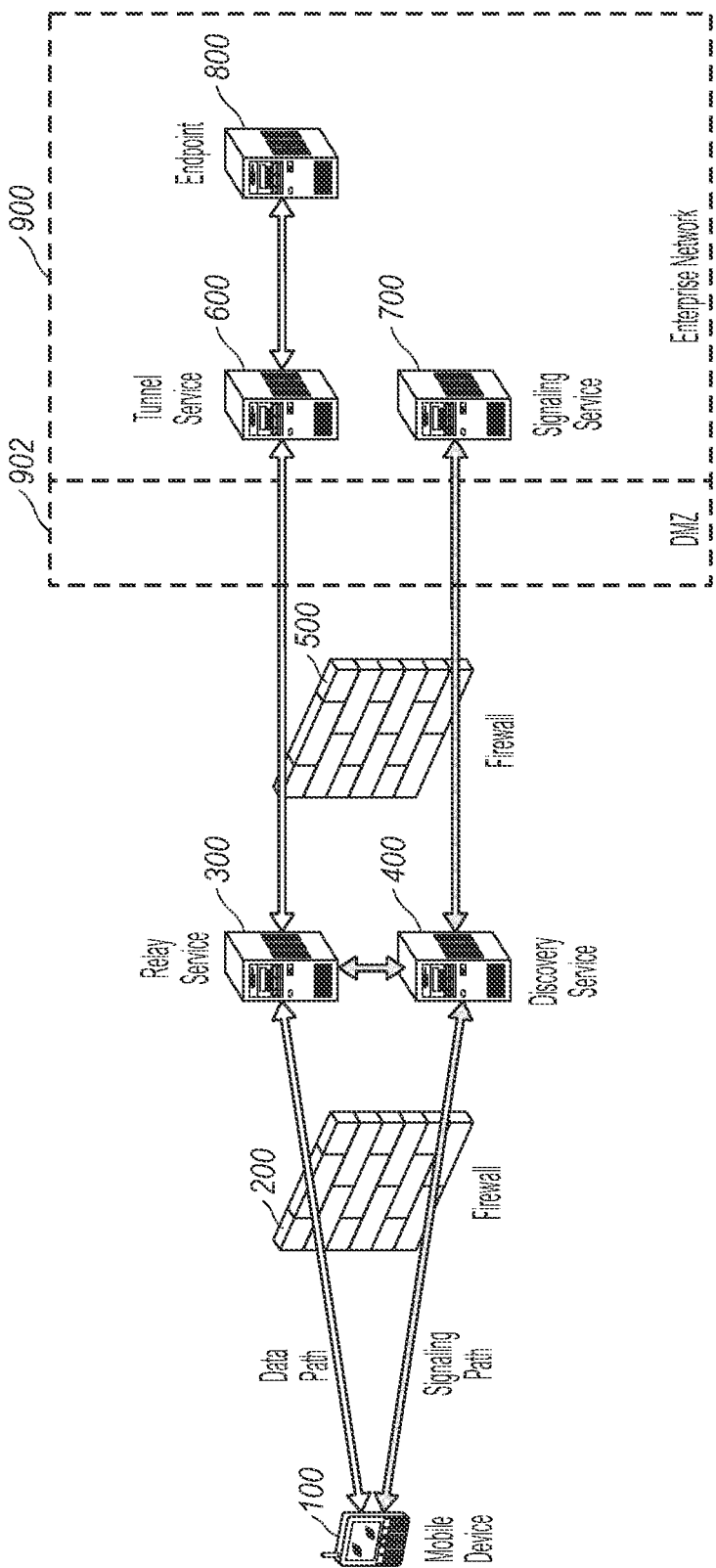
FIG. 1 is a block diagram of a system configured to establish a secure tunnel between tunnel service server and a computing device to ensure application data transmission between the endpoint and the communication device in accordance with an exemplary embodiment.

Various examples are provided herein. While specific examples are discussed, it should be understood that this is for illustration purposes only. A person skilled in the relevant art will recognize that other components and configurations may be used without departing from the spirit of the disclosure.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The phrase "coupled" is defined as connected, whether directly or indirectly through intervening components, and is not necessarily limited to physical connections. For example, coupled devices can include devices which are in signal communication with one another. The term "communicatively coupled" is defined as connected, whether directly or indirectly through intervening components, is not necessarily limited to a physical connection, and allows for the transfer of data.

The term "electronic device" or "computing device" is defined as any device that is capable of at least accepting data and executing commands. In at least one embodiment, the electronic device includes memory and a processor. In at least one embodiment, the electronic device or computing device can be configured to transmit data. In another embodiment, the electronic device or computing can be configured to receive data. In yet another embodiment, the electronic device or computing can be configured to transmit and receive data. Some examples of electronic devices or computing devices can include, but are not limited to, portable communication devices, mobile communication devices, mobile computers, smartphones, computing pads, tablet computers, personal computers, desktop computers, laptop computers, netbooks, servers, routers, set-top phones, or other electronic devices capable of at least accepting data, transmitting data, and executing commands. The term "mobile device" is defined as any electronic device that is capable of at least accepting information entries from a user and includes the device's own power source.

The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies.

The term "medium" refers to memory or a storage device. The medium can be transitory or non-transitory. In one specific example the medium includes tangible and/or non-transitory computer-readable storage medium for carrying or having computer-executable instructions or data structures stored thereon. Such non-transitory computer-readable storage medium can be any available medium that can be accessed by a general purpose or special purpose computer, including the functional design of any special purpose processor. By way of example, and not limitation, such non-transitory computer-readable medium can include RAM, ROM, EEPROM, CD-ROM or other optical disk storage, magnetic disk storage or other magnetic storage devices, or any other medium which can be used to carry or store computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable medium.

The term "server" is defined as one or more hardware devices or software components that are configured to execute instructions or is a set of instructions residing on one or more hardware components. A hardware server can include a processor and/or memory. In one or more embodiments, the hardware server can include an input device and/or an output device. An "application" is computer software that is designed to help the user perform specific tasks. An application includes instructions that can be executed by an electronic device. For example, a processor of the electronic device can execute instructions for the application. Additionally, the application can be stored on a storage medium including memory. Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

The term "secure coupling" refers to the communicative coupling of two devices, such that the communication between the two devices is secured at least through encryption. When two devices are securely coupled, the communication therebetween cannot be effectively intercepted without unencrypting the communication.

A "wireless communication" means communication that occurs using electromagnetic radiation and does not require a physical connection between communicating components.

The present disclosure uses a variety of different abbreviations and/or acronyms for telecommunications. One acronym is network address and port translation (or translator) (NAPT). Another is De-Militarized Zone (DMZ) which in this context refers to a perimeter network that is a physical or logical subnetwork that allows for external-facing services of an enterprise network. Yet another acronym is NAT, which is network address translation (or translator). Still another is NAT-T, which is NAT traversal. Another is ICE, which is interactive connectivity establishment. Yet another is SDP, which is session description protocol. An IPv6 router refers to a router that is internet protocol version 6 router. An IPv4 is an internet protocol version 4. IP refers to an internet protocol. A DTLS is a datagram transport layer security. TLS is a transport layer security. UDP is a user datagram protocol. A TCP is transmission control protocol. A BUDP is bidirectional user datagram protocol.

Those of skill in the art will appreciate that other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote medium.

Systems, devices and methods are presented herein enabling secure coupling of a computing device, such as a mobile device with an endpoint, such as an application server. The computing device can include any electronic device such as a computer, a server, an application server, a mobile device or tablet. The endpoint can be any electronic device as well that is located within an enterprise network. In at least one embodiment, the secure coupling of the mobile device with a computing device can include a security gateway server. In one example, the security gateway server can be a tunnel service server. In another embodiment, the endpoint can be an application server, which can include a tunnel service module to provide the secure coupling with the computing device, such as a mobile device.

In at least one embodiment, the present disclosure can be configured to establish a secure tunnel between a computing device and an endpoint. Examples of how the secure tunnel is established are provided herein. The establishment of the secure tunnel can be achieved by sending outbound connections through one or more firewalls from the endpoint to a relay server. In one or more embodiments, the secure tunnel can be a direct connection between the endpoint and the computing device. In one or more other embodiment, the direct connection or the connection to the relay can be between the mobile device and a secure tunnel server, which can be coupled to the endpoint. Additionally, the computing device can be behind a firewall and also configured to send an outbound connection request to a relay server. The relay server that the endpoint is communicatively coupled to can be different from the relay server that the computing device is communicatively coupled to. When there are two relay servers, the relay servers can be communicatively coupled to one another. While the examples are provided for only a single computing device and a single endpoint, the present disclosure can be implemented with multiple computing devices and a single endpoint. Furthermore, the present disclosure can be implemented with a single computing device and multiple endpoints. Additionally, the present disclosure can be implemented with multiple computing devices and multiple endpoints. Also, the present disclosure can be implemented with a plurality of relay servers.

In other embodiments, a secure tunnel can be established from a tunnel service server. The secure tunnel is established from the tunnel service server to computing device, wherein the tunnel service server is located within the enterprise network and the endpoint is communicatively coupled within the enterprise network to the tunnel service server. In other embodiments, where the endpoint itself establishes the secure tunnel, the function of the tunnel service server can be implemented on the endpoint. Also, the present disclosure can be implemented with a plurality of tunnel service servers.

As only outbound connection requests are made, the one or more firewalls can remain configured to only allow for outbound traffic and prevent inbound traffic.

Once the outbound connections requests are transmitted, the secure tunnel can be established based upon the outbound connection requests. The secure tunnel can be established between the computing device and the tunnel service server in one embodiment. In another embodiment, the secure tunnel can be established between the computing device and the endpoint. The secure tunnel once established can allow for data to flow in both directions. For example the data can flow from the computing device to the endpoint. In another example, the data can flow from the endpoint to the computing device.

In establishing the secure tunnel, a discovery service can be implemented. The discovery service can provide data to the computing device about the relay server, so that the computing device can send a connection request to the appropriate relay server. In other implementations, the information regarding the appropriate relay server can be provided to the computing device in other ways, for example it can be sent via a data connection from an administrator to the computing device, a carrier can provide data to the computing device so that the computing device can locate the relay server, or the operator can enter the relay server information directly into the computing device.

Additionally, in at least one embodiment, a signaling service can be provided to provide data to the computing device about the address and/or location of the tunnel service server. In other embodiments, the address and/or location of the tunnel service server can be provided to the computing device. For example the address and/or location can be provided by an administrator, a carrier on who's service the computing device is located, or the operator can enter the address/or location directly. Furthermore, when the tunnel service server functionality is incorporated into the endpoint, the same procedures as described above can be implemented.

The secure tunnel in at least one embodiment can established to provide complete encryption of the data that is transmitted from the computing device to the tunnel service server. Additionally, the secure tunnel can provide encryption of the data from the tunnel service server to the computing device. Still further, when the secure tunnel is established between the computing device and the endpoint, the data transmitted therebetween can likewise be encrypted.

FIG. 1 is a block diagram of a system configured to establish a secure tunnel between a tunnel service server and a mobile device to ensure encrypted application data transmission between the application server and the mobile device in accordance with an exemplary embodiment. In one or more embodiments, the application data can be not encrypted. In one or more embodiments, the application data can be encrypted. When the application data is encrypted, the present disclosure includes further encrypting the application data. As illustrated, the system includes host or communication endpoint 800. The communication endpoint 800 can be a computing device. The computing device can include any electronic device such as a computer, a server, an application server, a mobile device or tablet. An application server can be configured to run an application. Additionally, the communication endpoint 800 can be configured to be a file sharing system or general server. The communication endpoint 800 can be configured to share application data with a mobile device 100. The mobile device 100 as illustrated can be located outside of the enterprise network 900. While a mobile device 100 is illustrated, other computing devices are including within the scope of the present disclosure. In one example, the enterprise network 900 can be a proprietary network that belongs to a company. In another example, the enterprise network 900 can be a network that requires credentials to gain access to the equipment and/or data located within the enterprise network 900. The enterprise network 900 can be located behind one or more firewalls 500. In one or more embodiments, the firewall 500 can be configured to allow only outbound connection establishments. In one or more embodiments, inbound connections can also be permitted over predetermined ports which allow access to one or more electronic devices behind the firewall. In other embodiments, an additional device can be configured to be behind the firewall and provide a NAT/NAPT function. The NAT/NAPT function allows for translation of network addresses and ports for incoming and outgoing data. The firewall 500 can be located just outside of an area of the enterprise network 900 known as the DMZ 902. The DMZ 902 contains entities that must be visible through the firewall to outside computers such as mail servers, web servers, and other external facing devices. In another embodiment, the tunnel service server 600 can be located in the DMZ 902. In still another embodiment, the signaling service server 700 can be located in the DMZ 902. When the tunnel service server 600 and/or the signaling service server 700 is located in the DMZ the tunnel service server 600 and/or the signaling service server 700 can be configured to allow electronic devices outside of the firewall 500 to access the tunnel service server 600 and/or the signaling service server 700.

The enterprise network 900 can also include a tunnel service server 600 and a signaling service server 700. The tunnel service server 600 can be configured to provide for a secure tunnel to the mobile device 100. In one or more embodiments the tunnel service server 600 can be incorporated into the endpoint 800. The signaling service server 700 can be configured to provide network addresses and other information to allow access to the enterprise network 900. For example, a network administrator can create profiles to allow electronic devices to receive data from the signaling service server 700. The data from the signaling service server 700 can include one or more network addresses. For example, the one or more network addresses can include an external network address for the enterprise network 900. This external network address for the enterprise network 900 can be a network address that allows an external electronic device to find the DMZ 902. When the tunnel service server 700 is located within the DMZ 902, the address is for the tunnel service server 700. In further examples, the signaling service server 700 can be configured to provide internal network addresses to allow access to one or more servers located within the enterprise network 900. For example, the signaling service server 700 can provide an internal network address of the tunnel service server 600. The internal network address for the tunnel service server 600 can be provided to allow direct access to the tunnel service server 600 once the data passes through the DMZ 902 into the enterprise network 900.

The system can further include a relay service server 300 and a discovery service server 400. The relay service server 300 is located outside of the enterprise network 900. The relay service server 300 is configured relay data between two endpoints and/or computing devices. For example, the relay service server 300 can be configured to relay information between the endpoint server 800 and the mobile device 100. The relay service server 300 can be configured to receive data including data packets that are addressed to it. Then the relay service server 300 can repackage the data and transmit it to the desired destination. For example, if the endpoint server 800 sends data to the mobile device 100 through the relay service server 300, the data packet can be first addressed to the relay service server 300 and contain a destination address for the mobile device 100. Once the data packet is received by the relay service server 300, the relay service server 300 opens the packet and determines the destination address and then repackages the data into another packet and transmits the repackaged packet to mobile device 100.

In one or more configurations, the relay service server 300 can be located on the internet such that address of the relay service server 300 can be discovered. In other configurations, the relay service server 300 can be located on a secure network such that the address of the relay service server 300 can only be discovered by registering with the secure network.

The relay service server 300 can be a proprietary server that is custom programmed for the relay of data between two endpoints such as an endpoint server 800 and a mobile device 100. The relay service server 300 can also be configured to transmit data between two mobile devices. In yet another embodiment, the relay service server 300 can be configured to transmit data between two servers. In other examples, the relay service server 300 can be a Traversal Using Relays around NAT (TURN) server. The TURN server allows for exchange of data between a server within an enterprise network 900 and an electronic device, such as a mobile device, located outside of the enterprise network 900.

While the relay service server 300 is illustrated as being communicatively coupled to two endpoints, the relay service server 300 can be configured to be coupled to a plurality of endpoints. For example, the relay service server 300 can be configured to be coupled to greater than one thousand (1,000) endpoints. In another example, the relay service server 300 can be configured to be coupled to less than one thousand (1,000) endpoints. In another example, the relay service server 300 can be configured to be coupled to less than one thousand (1,000) endpoints and greater than five hundred (500) endpoints. In still another example, the relay service server 300 can be configured to be coupled to less than five hundred (500) endpoints and greater than one hundred (100) endpoints.

Additionally, when a plurality of endpoint servers 800 are provided, the plurality of endpoint servers 800 can be located on one or more enterprise networks 900. For example, each endpoint server 800 can be located on a separate enterprise network 900. In other embodiments, two or more endpoint servers 800 can be located on a single enterprise network 900. Other combinations of the location of the endpoint servers 800 are considered within the scope of this description.

In one or more embodiments, the system can include a discovery service server 400. The discovery service server 400 can be configured to allow discovery of the relay service server 300. The discovery service server 400 can allow for discovery of data paths that allow for the secure coupling of the endpoint application server 800 and the mobile device 100. For example, the discovery service server 400 can be configured to be communicatively coupled to the signaling service server 700 located in the enterprise network 900. The discovery service server 400 can be further configured to be communicatively coupled to the relay service server 300. Still further the discovery service server 400 can be configured to be communicatively coupled to the mobile device 100. In at least one embodiment, the discovery service server 400 can be located on internet. In another embodiment, the discovery service server 400 can be located on a secure network.

The system can further include a mobile device firewall 200. The mobile device firewall 200 can be located on either the wireless provider's system or other system through which the mobile device 100 is connected to the internet. In other embodiments, an additional device that is capable of providing NAT and/or NAPT functionality can be provided between the firewall 200 and the mobile device 100.

The mobile device 100 can be configured to receive data from the relay service server 300 and/or the discovery service server 400. The mobile device 100 can be further configured to transmit data to the relay service server 300 and/or the discovery service server 400.

As illustrated in FIG. 1, there can be a data path and/or a signaling path. In other embodiments, the signaling path can be removed. For example, the signaling path is not needed in certain configurations, where address information is provided to the mobile device concerning the address of the relay service server 300. In other embodiments, the discovery service server 400 can provide the address information for the relay service server 300.

Figure 2:
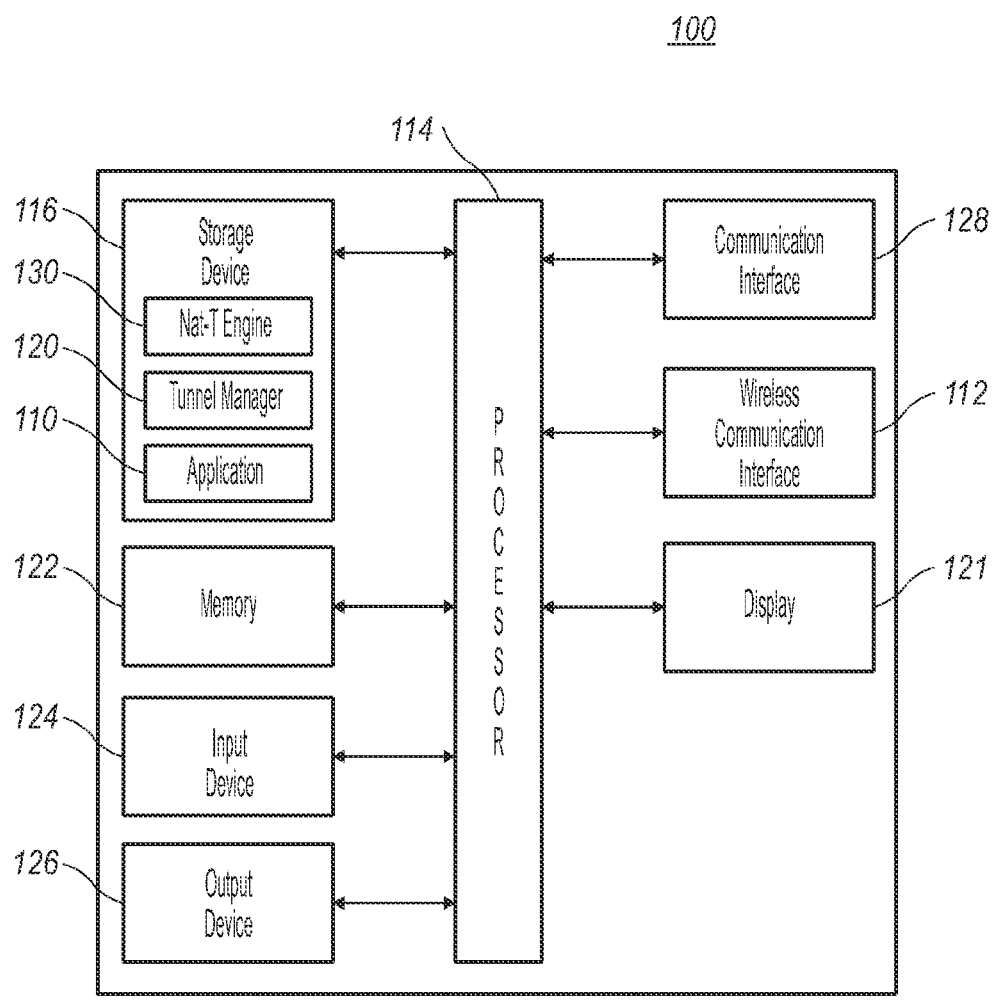
FIG. 2 is a block diagram of a mobile device in accordance with an exemplary embodiment.

FIG. 2 is a block diagram of a mobile device in accordance with an exemplary embodiment. The mobile device 100 can include one or more displays 121, one or more input devices 124, one or more output devices 126, one or more wireless communication interfaces 112, one or more memory devices 122, one or more storage devices 116, and one or more communication interfaces 128, and at least one processor 114. The one or more displays 121 can include a display on a front of the device 100 and/or a display on the rear of the device 100. Additionally, when the mobile device 100 is configured to slide or flip, the one or more displays 121 can be positioned on components of the mobile device 100 that allow the one or more displays 121 to be seen by an operator. The one or more displays 121 can be configured to display visual data to the operator of the mobile device 100. The one or more displays 121 can be liquid crystal display (LCD), a projection display that displays the data on a near-by surface, light emitting diode (LED) display, or other technology that is configured to display visual data to an operator. The display 121 can also be a touchscreen device that functions both as a display 121 and an input device.

The one or more input devices 124 can include a variety of different input devices 124. For example, the one or more input devices 124 can include a keyboard, an action button, a navigation device, a power switch, volume keys, and direct input connections. The one or more output devices 126 can include one or more of: one or more vibrator motors, one or more LEDs, one or more lights, or one or more speakers. While the preceding list of possible input and output devices is provided, the present disclosure encompasses other input and output devices which are not specifically enumerated herein.

The wireless communication interface 112 can include one or more wireless communication interfaces. For example, the wireless communication interface 112 can be configured to allow for communication with a wireless communication network. In other embodiments, the wireless communication interface 112 can include a short-range communication system such as a BLUETOOTH® communication module or a WI-FI® communication module (a communication module in compliance with IEEE 802.11b) and associated circuits and components.

The one or more communication interfaces 328 can be configured for wired communication. For example, the communication interfaces 328 include universal serial ports, parallel ports, Ethernet ports, and other wired connection ports.

The mobile device 100 can include one or more additional components that are not mentioned above. Specifically, the mobile device 100 can include a battery, one or more microphones, one or more cameras, one or more communication ports, and one or more audio jacks.

While a single processor 114 is illustrated, two or more processors can be implemented according to the present disclosure. Additionally, other processors can be arranged in series between the illustrated (and non-illustrated) components and the processor to further enable handling or processing of information.

Additionally, the present technology includes executing instructions on a mobile device 100. As indicated above, the mobile device 100 can include a memory 122 and a processor 114. In at least one implementation, the memory 122 can be a non-transitory memory. The processor 114 can be communicatively coupled to the memory 122. The processor 114 can be configured to execute instructions stored in the memory 122. The storage device 115 can be configured to store one or more modules. The one or more modules can store instructions that can be executed by the mobile device 100. The memory 122 can be configured to be communicatively coupled to a storage device 116, such that instructions contained on the storage device 116 can be transferred to the memory 122 for execution.

As illustrated, the storage device 116 stores three modules: NAT-T engine 130, tunnel manager 120, and application 110. In one or more other embodiments, the NAT-T engine 130 and the tunnel manager 120 can be combined into a single tunnel service module. The NAT-T engine can include instructions for execution by the processor 114 to allow the mobile device 100 to transmit data through a firewall 200. The tunnel manager 120 can include instructions for execution by the processor 114 to allow the mobile device to package an application for transmission to the endpoint server 800 and also unpackage data received from the endpoint server 800. As indicated above the packaged data can be transmitted through one or more firewalls (200, 500) and a relay service server 300. The application module 110 can include instructions for execution by the processor 114 to allow the mobile device 100 to perform one or more functions such as database access, file processing, document preparation, games, or other function that requires access to data stored on an endpoint server 800 or the ability to transmit data to an endpoint server 800. Furthermore, additional modules can be included which are not illustrated.

Figure 3:
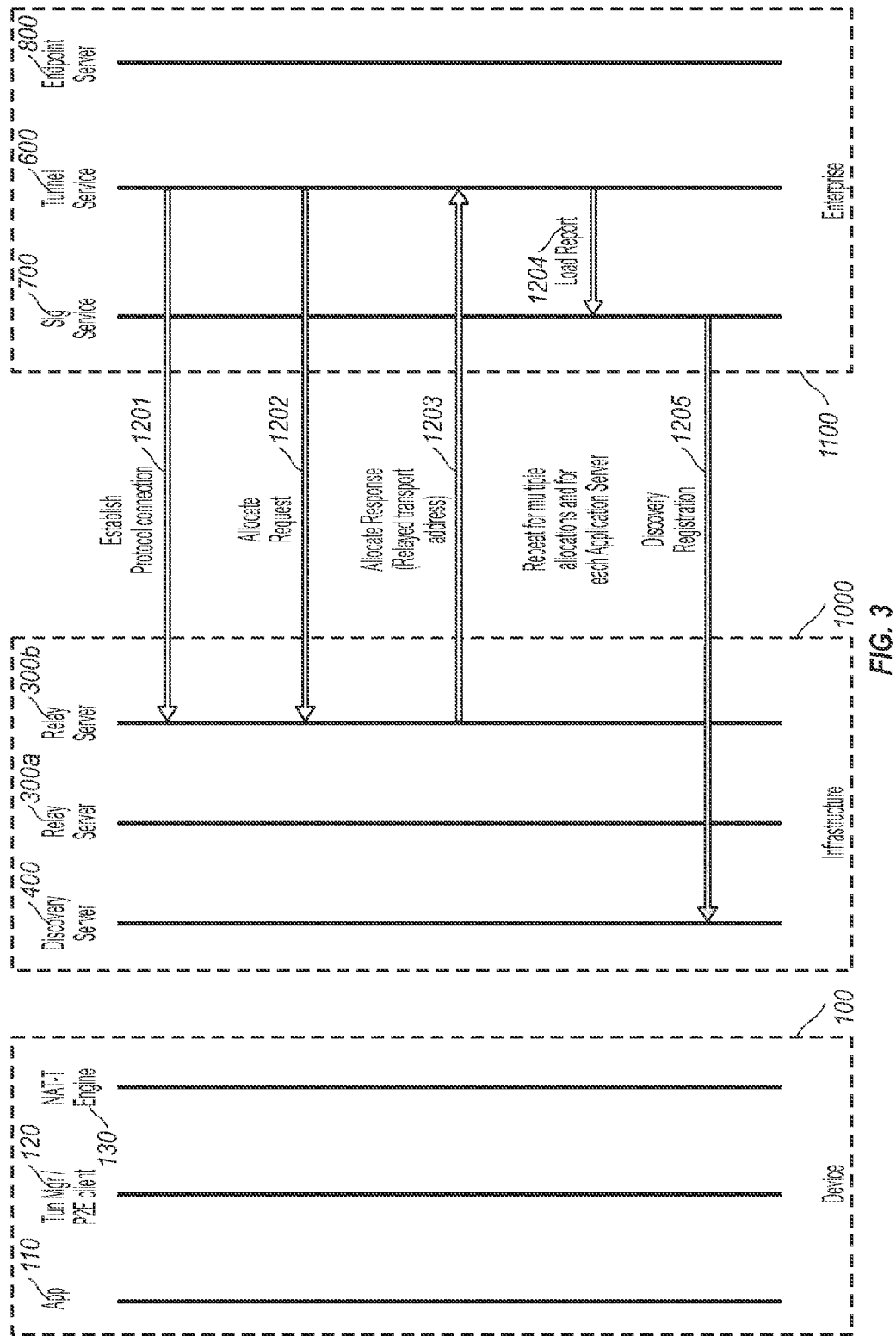
FIG. 3 is a message sequence chart for establishing connection information for a secure tunnel in accordance with an exemplary embodiment.

FIG. 3 is a message sequence chart for establishing connection information for a secure tunnel in accordance with an exemplary embodiment. As illustrated, the tunnel service server 600 sends data to establish a protocol connection to a second relay server 300b (1201). Additionally, the tunnel service server 600 sends an allocation request to the second relay server 300b (1202). The second relay server 300b sends an allocate response data to the tunnel service server 600 (1203). The allocate response data can include a relayed transport address. In response to receiving the allocate response, the tunnel service server 600 can send a load report to the signaling service server 700 (1204). The signaling service server 600 can then send discovery registration data to the discovery server 400 which is located in the general infrastructure 1000. While two separate relay servers 300a and 300b are illustrated, the present technology can be implemented with a single relay server 300. While only two relay servers 300a and 300b are illustrated, a system configured according to the present disclosure can be implemented with a plurality of relay servers 300. For example, a system according to the present technology can implement a plurality of servers based upon the number of devices and/or accounts associated with the system. The relay servers 300 can be located in a single location or the relay servers 300 can be separated geographically so as to provide redundancy and a more localized connection point. As shown both the signaling service server 700 and the tunnel service server 600 are located within an enterprise network 1100.

Figure 4:
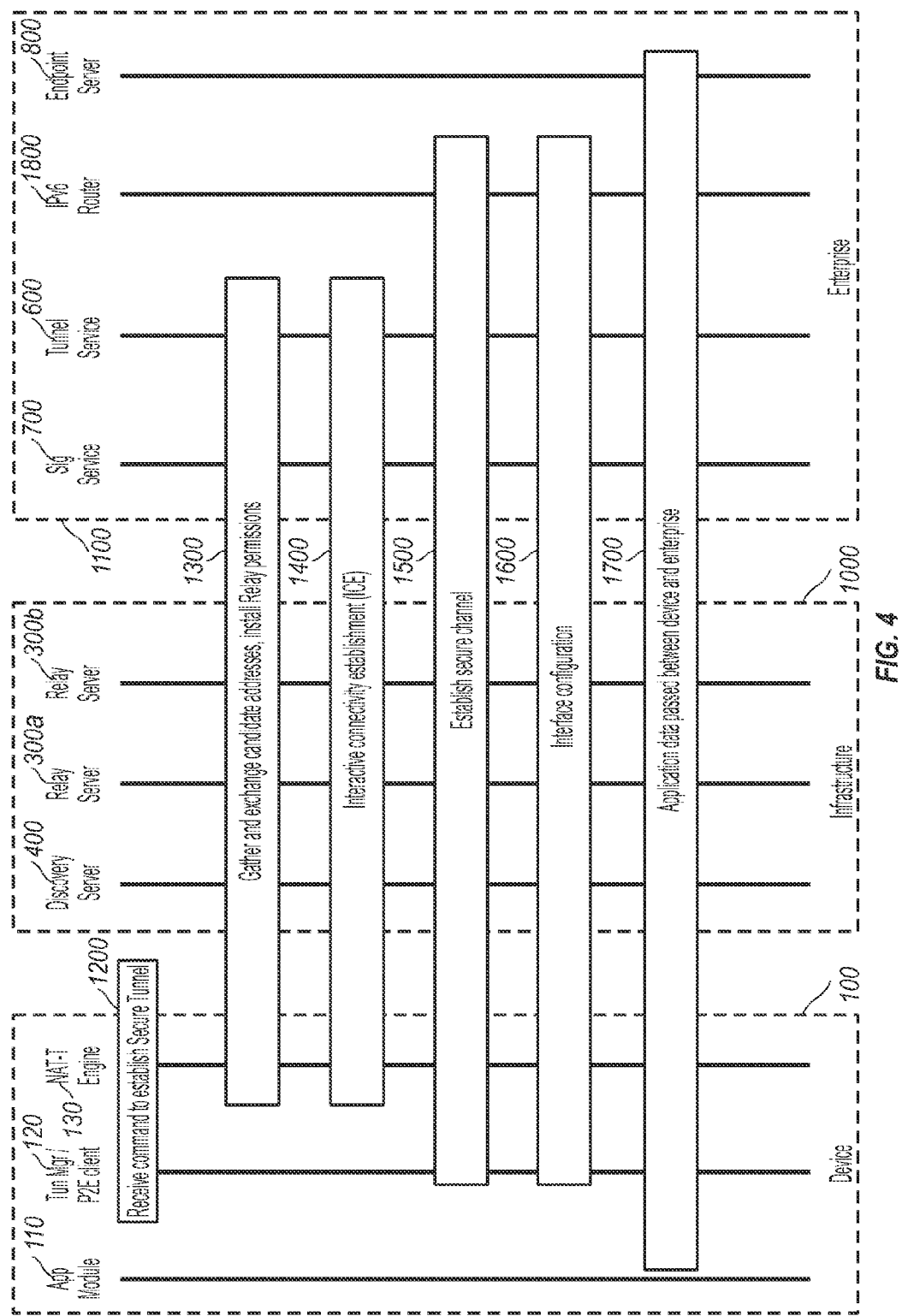
FIG. 4 is a message sequence chart illustrating the steps in transmitting application data in accordance with an exemplary embodiment.

FIG. 4 is a message sequence chart illustrating the steps in transmitting application data in accordance with an exemplary embodiment. As illustrated the sequence chart shows the steps that the system, which can include a mobile device 100; a discovery server 400; a first relay server 300a; a second relay server 300b; a signaling service server 700; tunnel service server 600; router 1800; and an endpoint server 800, performs in establishing a secure tunnel between the endpoint server 800 and the mobile device 100. The exchange of data can begin when the operator of the mobile device 100 requests establishment of a secure tunnel. In other embodiments, the exchange of data can begin in response to automatic routine or a predetermined time. The mobile device 100 receives the request or command to establish a secure tunnel 1200. For example, the operator can select an icon, a menu item, a selectable item on a touch screen, or other input to request establishing the secure tunnel 1200.

In response to the received request to establish the secure tunnel 1200, the system can execute additional data transmissions. In at least one embodiment, the system can gather and exchange candidate addresses and install relay permission 1300. In at least one embodiment, the system establishes connectivity 1400. For example, when the system establishes connectivity, the system does so by following ICE procedures. In at least one embodiment, the system can establish a secure channel 1500. In at least one embodiment, the system can generate an interface configuration 1600. In at least one embodiment, application data can be passed between the mobile device and the enterprise 1100. Each of the steps as presented in FIG. 4 can include one or more steps within the respective step. Some of the steps will be presented herein below.

Figure 5:
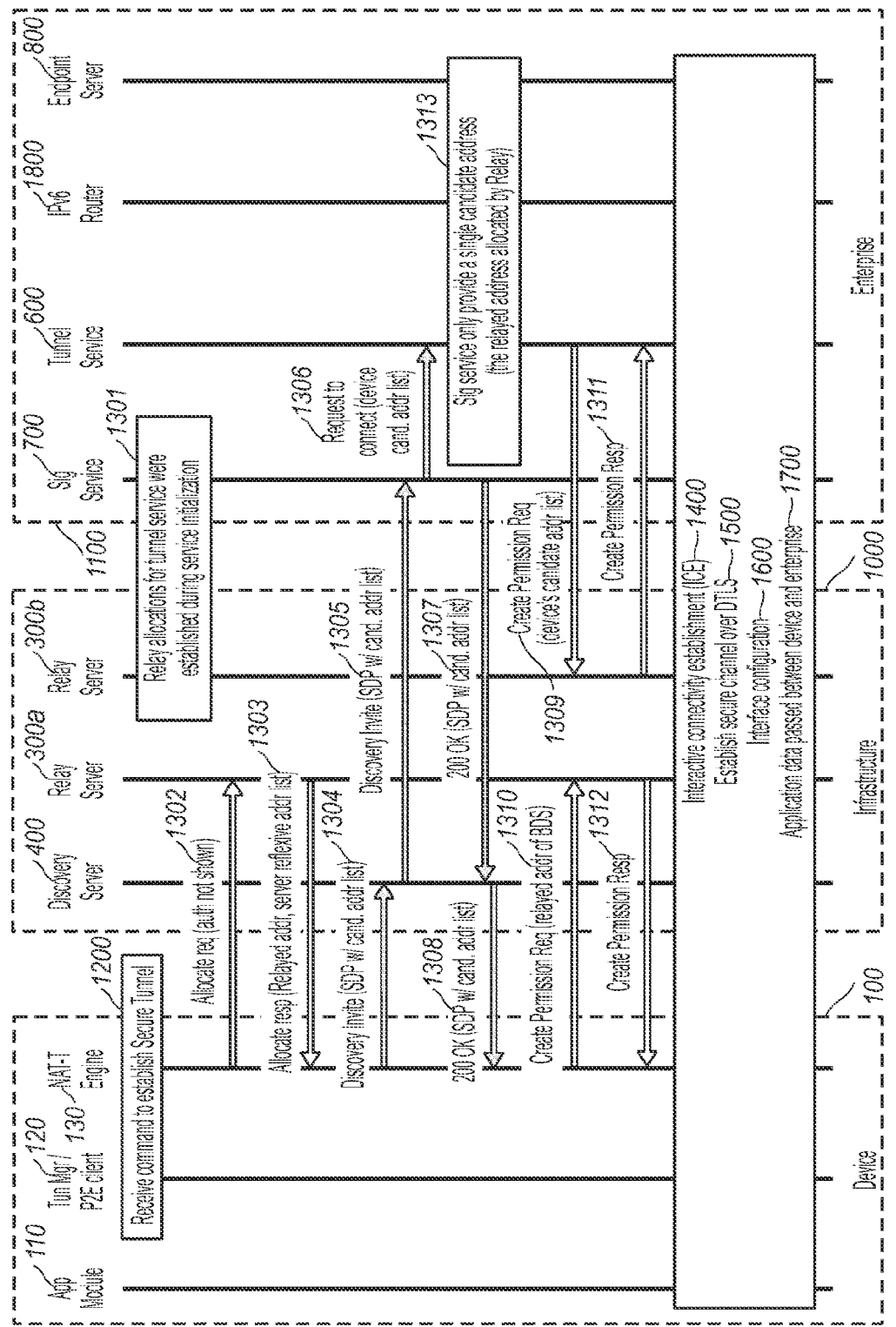
FIG. 5 is a message sequence chart illustrating the steps in gathering and exchanging candidate addresses and installing relay permissions in accordance with an exemplary embodiment.

FIG. 5 is a message sequence chart illustrating the steps in gathering and exchanging candidate addresses and installing relay permissions in accordance with an exemplary embodiment. When a signaling service server 700 and relay server 300*b* are initially set up, the relay allocations for the tunnel service can be established during the service initialization 1301. Once the mobile device 100 receives the command to establish the secure tunnel, the mobile device 100 sends an allocate request 1302 from the NAT-T engine module to the relay server 300*a*. The relay server 300*a* responds to the allocate request 1302 with an allocate response 1303 to the NAT-T engine module 130 running on the mobile device 100. The allocate response 1303 can contain a relayed address and/or server reflexive address list. The allocate response 1303 allows the NAT-T engine module 130 to determine address information for packaging of the data.

The NAT-T engine 130 can further transmit a discovery invite 1304 to the discovery server 400. In at least one embodiment, the discovery invite 1304 can be a session initiation protocol (SIP) invite. The discovery invite 1304 can include a session description protocol (SDP) including a candidate address list for the mobile device 100. Then, the discovery server 400 transmits the discovery invite 1305 to the signaling service server 700 inside of the enterprise network 1100. The signaling service server 700 then transmits a request to connect 1306 to the tunnel service server 600. The request to connect 1306 can include the mobile device candidate address list. In at least one embodiment, the signaling service only provides a single candidate address 1313. In one embodiment, a single candidate address can be the relayed address allocated by the relay 300. In other embodiments, a plurality of candidate addresses can be provided. When a single address is provided, the communication can be streamlined to avoid attempting to deliver the package to multiple addresses.

The signaling service server 700 responds to discovery invite 1305 with response 1307 to indicate the request has succeeded. The response 1307 is transmitted from the signaling service server 700 to the discovery service server 400. In at least one embodiment, the response 1307 can be a 200 OK message. The response 1307 can further include SDP and a candidate address list for the tunnel service server 600. Upon receiving the response 1307, the discovery server 400 can send a response 1308 to the NAT-T engine module 130. The response 1308 can be a 200 OK message. The response 1308 can further include SDP and a candidate address list for the tunnel service server 600.

Once the response 1308 is received by the mobile device 100, the NAT-T engine module 130 transmits a create permission request 1310 to the relay server 300*a*. The create permission request 1310 can include a relayed addresses of the tunnel service server 600. Similarly, the tunnel service server 600 sends a create permission request 1309 to the relay server 300*b*. After the relay server 300*a* receives the create permission request 1310, the relay server 300*a* transmits a create permission response 1312 to the NAT-T engine module 130 on the mobile device 100. Additionally, the relay server 300*b* can send a create permission response 1311 to the tunnel service server 600 in response to receiving the create permission request 1309.

Figure 6:
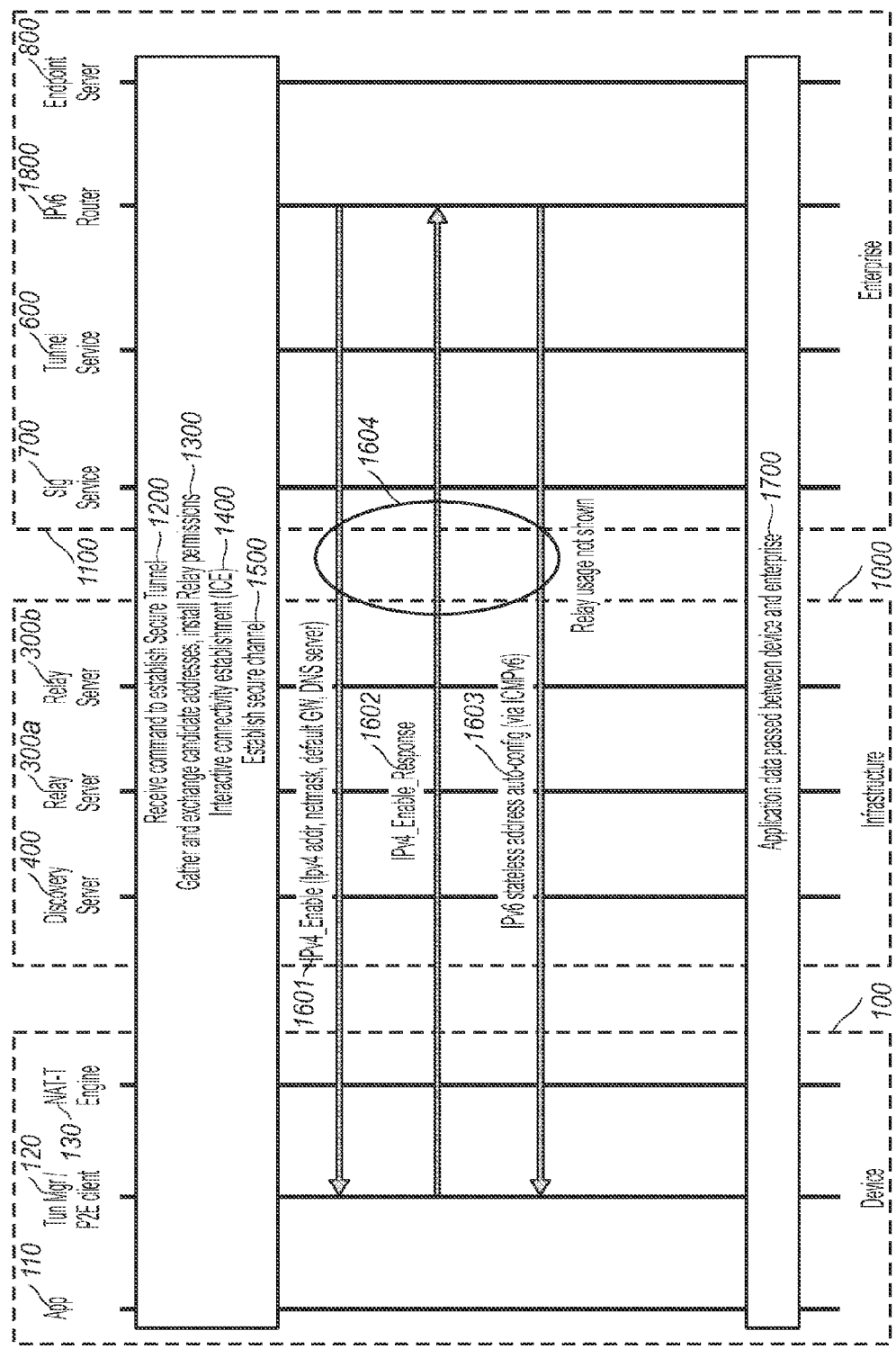
FIG. 6 is a message sequence chart illustrating the steps in interface configuration in accordance with an exemplary embodiment.

FIG. 6 is a message sequence chart illustrating the steps in interface configuration in accordance with an exemplary embodiment. As illustrated in FIG. 6, the system can include an IPv6 router 1800. In other embodiments, other routers capable of establishing a tunnel can be used in place of the IPv6 router 1800. When other routers are used, they can be configured to allow for the desired tunneling properties. For example, the router 1800 can be a modified IPv4 router.

The detailed steps illustrated in FIG. 6 can be performed after the system has received the command to establish a secure tunnel 1200, gathered and exchanged candidate addresses and permissions and installed relay permissions 1300, the connectivity is established 1400, and a secure channel has been established 1500. After the secure channel is established 1500, the IPv6 router 1800 can send an IPv4 enable command to the tunnel manager module 120 on the mobile device. The IPv4 enable command can include an IPv4 address, a netmask, a default gateway (GW), and an address for a domain name system (DNS) server of the IPv6 router 1800. Once the tunnel manager module 120 operating on the mobile device 100 receives the IPv4 enable command 1601, the tunnel manager module 120 can respond by sending an IPv4 enable response 1602. The IPv4 enable response 1602 is sent from the tunnel manager module 120 to the IPv6 router 1800. Once the IPv6 router 1800 receives the IPv4 enable response 1602, the router 1800 can respond with an IPv6 stateless address auto-configure command 1603. The IPv6 stateless address auto-configure command 1603 can be transmitted via internet control message protocol (ICMP). For example, the ICMP can be ICMPv6. In other embodiments, other versions of ICMP can be implemented. In still other embodiments, the IPv6 stateless address auto-configure command 1603 can be sent via other protocols.

As indicated by oval 1604, the above transmission of commands does not show relay usage. The usage of the relay is further illustrated in other sequence charts.

Figure 7:
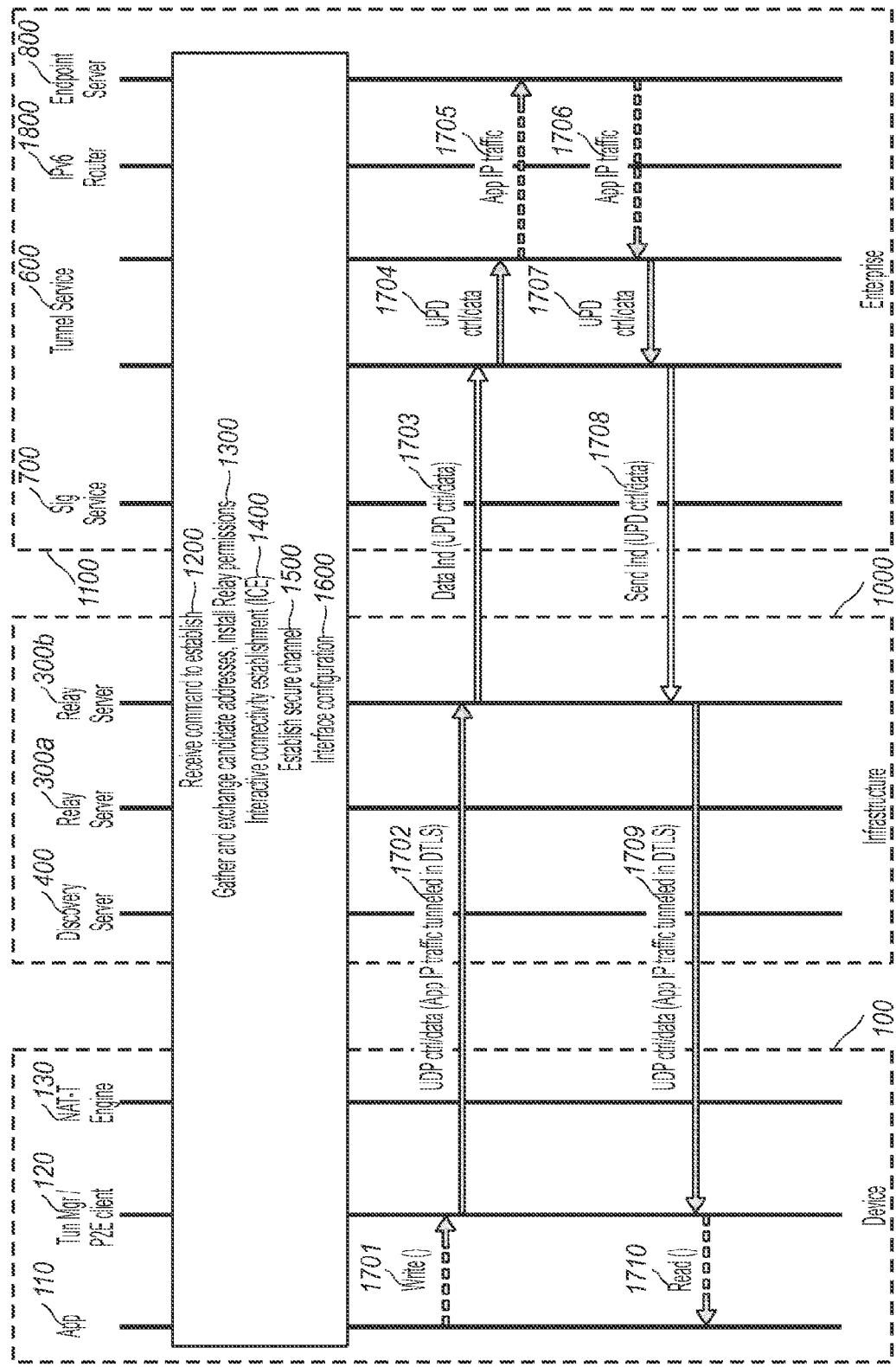
FIG. 7 is a message sequence chart illustrating the transmission of application data being passed between the computing device and the enterprise network in accordance with an exemplary embodiment.

FIG. 7 is a message sequence chart illustrating the transmission of application data being passed between the mobile device 100 and the enterprise network 1100 in accordance with an exemplary embodiment. The communication of data illustrated in FIG. 7 occurs after the system has received the command to establish a secure tunnel 1200, gathered and exchanged candidate addresses and permissions and installed relay permissions 1300, the connectivity is established 1400, a secure channel has been established 1500, and the interface has been configured 1600. While the preceding steps are executed in the order shown, the order can be vary. As illustrated, the mobile device 100 includes an application module 110 configured to be executed by a processor on the mobile device 100. The application module 110 is configured to allow an operator to input and receive data from a remote electronic device such as the endpoint server 800.

During execution of the application module 110, the operator can enter a command into the mobile device 100 such that the application module 110 issues a write command 1701 to write application data. The write data command 1701 is further processed according to instructions of the tunnel manager module 120. The tunnel manager module 120 packages the application data contained in the write command 1701 into a packet. The packet 1702 is transmitted from the tunnel manager module 120 to the relay server 300*b*. The packet 1702 can contain user datagram protocol control data and other data. The packet 1702 can be transmitted via a secure tunnel between the mobile device 100 and the relay server 300*b*. For example, the secure tunnel can be a datagram transport layer security (DTLS) secure tunnel. In other embodiments, other tunnels that provide for privacy for datagram protocols can be implemented.

Once the relay server 300*b* receives the packet 1702, the relay server 300*b* opens the packet to find the address of the tunnel service server 600 and repackages the data into a second packet 1703. The second packet 1703 can contain the data that was in packet 1702. In other embodiments, the second packet 1703 can contain all of the data that was in packet 1702 with the exception of the address information for the relay server 300b. Once the tunnel service server 600 receives the packet 1703, the tunnel service server 600 processes the data to remove tunnel data and/or encryption data. Once the unencrypted application data is generated by the tunnel service, the application data 1705 is sent to the endpoint server 800.

Similarly, FIG. 7 illustrates transmission of data from the endpoint server 800 to the mobile device 100. The transmission of data from the endpoint server 800 can be in response to receiving data, which may contain commands, from the mobile device 100 at the endpoint server 800. The transmission of data from the endpoint server 800 can be in response to a scheduled transmission of data, an update to data requirements, or another operator requesting that the endpoint server 800 transmit data to the mobile device 100.

The endpoint server 800 can transmit data 1706 to the tunnel service server 600. The tunnel service server 600 can process 1707 the data 1706 and packages the data into a first packet for transmission. The tunnel service server 600 can transmit the packaged data 1708 to the relay server 300b. The relay server 300b can open the packet and repackage the data into a second packet 1709. The second packet 1709 is transmitted from the relay server 300b to the mobile device 100. The second packet 1709 can include all of the data contained in the packet 1708. In another embodiment, the second packet 1709 can include all of the data except the relay server 300b address. The packet 1709 can be transmitted from the relay server 300b via a DTLS. The tunnel manager 120 of the mobile device 100 receives the packet 1709 and unpackages the packet and decrypts the application data. The data 1710 is then further processed according to the instructions in the application module 110.

Figure 8:
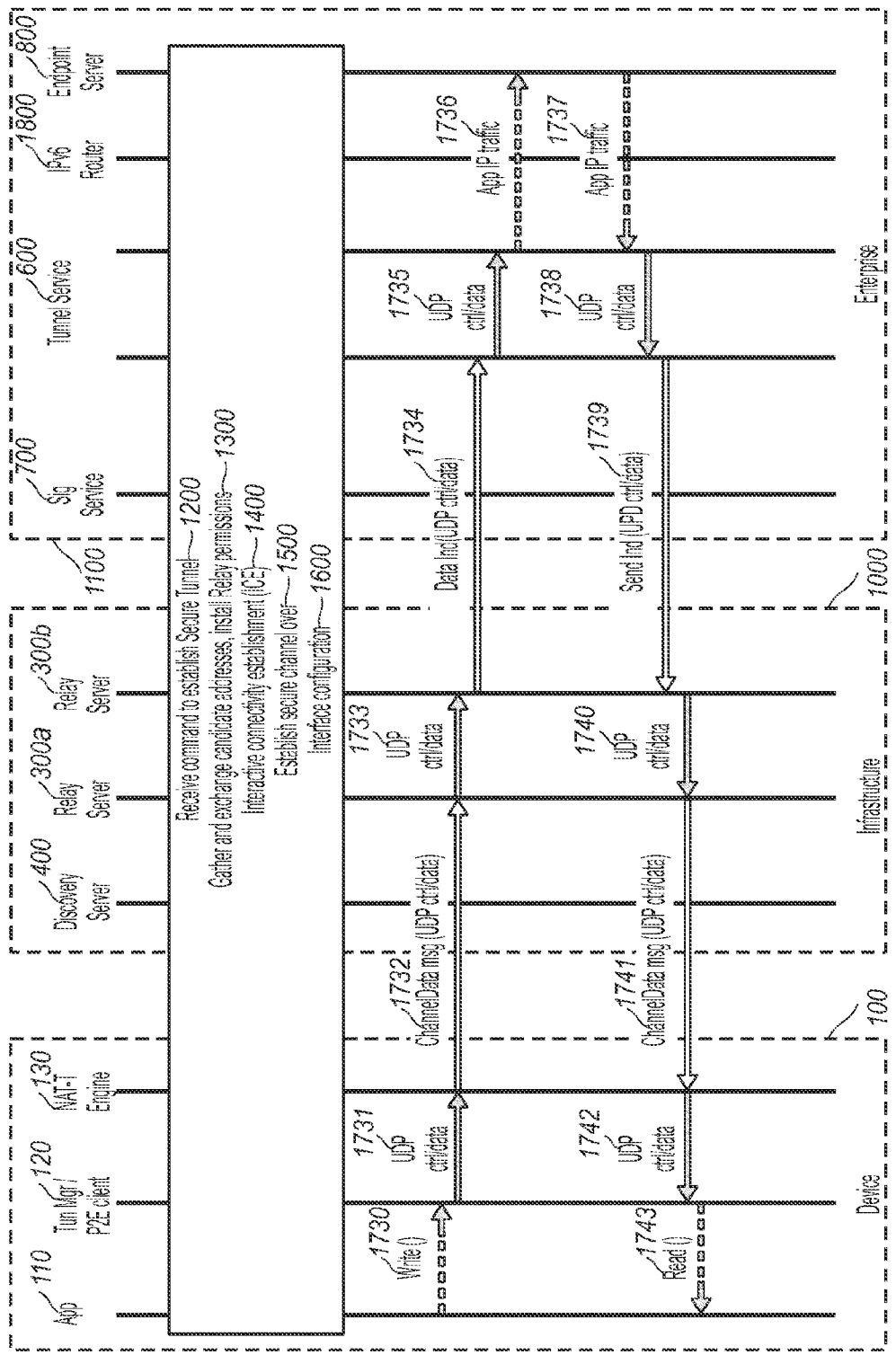
FIG. 8 is an alternate message sequence chart illustrating the transmission of application data being transmitted between the computing device and the enterprise network in accordance with an exemplary embodiment.

FIG. 8 is an alternate message sequence chart illustrating the transmission of application data being passed between the mobile device and the enterprise network in accordance with an exemplary embodiment. FIG. 8 illustrates a similar communication sequence as compared with FIG. 7, but includes a few additional steps.

The communication of data illustrated in FIG. 8 occurs after the system has received the command to establish a secure tunnel 1200, gathered and exchanged candidate addresses and permissions and installed relay permissions 1300, the connectivity is established 1400, a secure channel has been established 1500, and the interface has been configured 1600. While the preceding steps are executed in the order shown, the order can be vary. As illustrated, the mobile device 100 includes an application module 110 configured to executed by a processor on the mobile device 100. The application module 110 is configured to allow for an operator to input and receive data from a remote electronic device such as the endpoint server 800.

During execution of the application module 110, the operator can enter a command into the mobile device 100 such that the application module 110 issues a write command 1701 to write application data. The write data command 1730 is further processed according to instructions of the tunnel manager module 120. The tunnel manager module 120 processes the application data in the write command 1730 and creates a packet 1731. In creating the packet 1731, the application data can be encrypted or further encrypted. The packet 1702 can contain user datagram protocol control data and other data. The NAT-T engine module 130 on the mobile device receives the packet 1731 and processes the packet 1731 according to instructions stored in the NAT-T engine module 130. The NAT-T engine 130 can process the packet 1731 and package the packet 1731 in a channel data message 1732. The channel data message 1732 can contain the packet 1731. The channel data message 1732 is transmitted from the NAT-T engine 130 to the relay server 300a. The channel data message 1732 can be transmitted via a secure tunnel between the mobile device 100 and the relay server 300a. For example, the secure tunnel can be a datagram transport layer security (DTLS) secure tunnel. In other embodiments, other tunnels that provide for privacy for datagram protocols can be implemented.

Once the relay server 300a receives the channel data message 1732, the relay server 300a processes 1733 the channel data 1732 and can remove the relay server 300a address data and repackage the data into a second packet 1734. The second packet 1734 can contain the data that was in channel data message 1732 with the exception that the address information for the relay server 300b. Once the tunnel service server 600 receives the packet 1734, the tunnel service server 600 processes 1735 the packet 1734 to remove tunnel data and/or encryption data. Once the application data is generated by the tunnel service server 600, the application data 1736 is sent to the endpoint server 800.

Similarly, FIG. 8 illustrates transmission of application data from the endpoint server 800 to the mobile device 100. The transmission of application data from the endpoint server 800 can be in response to receiving data, which can contain commands, from the mobile device 100 at the endpoint server 800. The transmission of application data from the endpoint server 800 can be in response to a scheduled transmission of data, an update to data requirements, or another operator requesting that the endpoint server 800 transmit data to the mobile device 100.

The endpoint server 800 can transmit application data 1737 to the tunnel service server 600. The tunnel service server 600 can process 1738 the data 1737 and packages the data into packet 1739 for transmission. The tunnel service server 600 can transmit the packaged data 1739 to the relay server 300b. The relay server 300a process 1740 the packet and repackages the data into a channel data message 1741. The channel data message 1741 is transmitted from the relay server 300a to the mobile device 100. The channel data message 1741 can include all of the data contained in the packet 1737. The channel data message 1741 can be transmitted from the relay server 300a via a DTLS. The NAT-T engine 130 of the mobile device 100 receives the channel data message 1741 and unpackages the channel data message 1741. The unpackaged data is sent to the tunnel manager which further processes the data 1742 and decrypts the application data 1742. The application data 1743 is then further processed according to the instructions in the application module 110.

Figure 9:
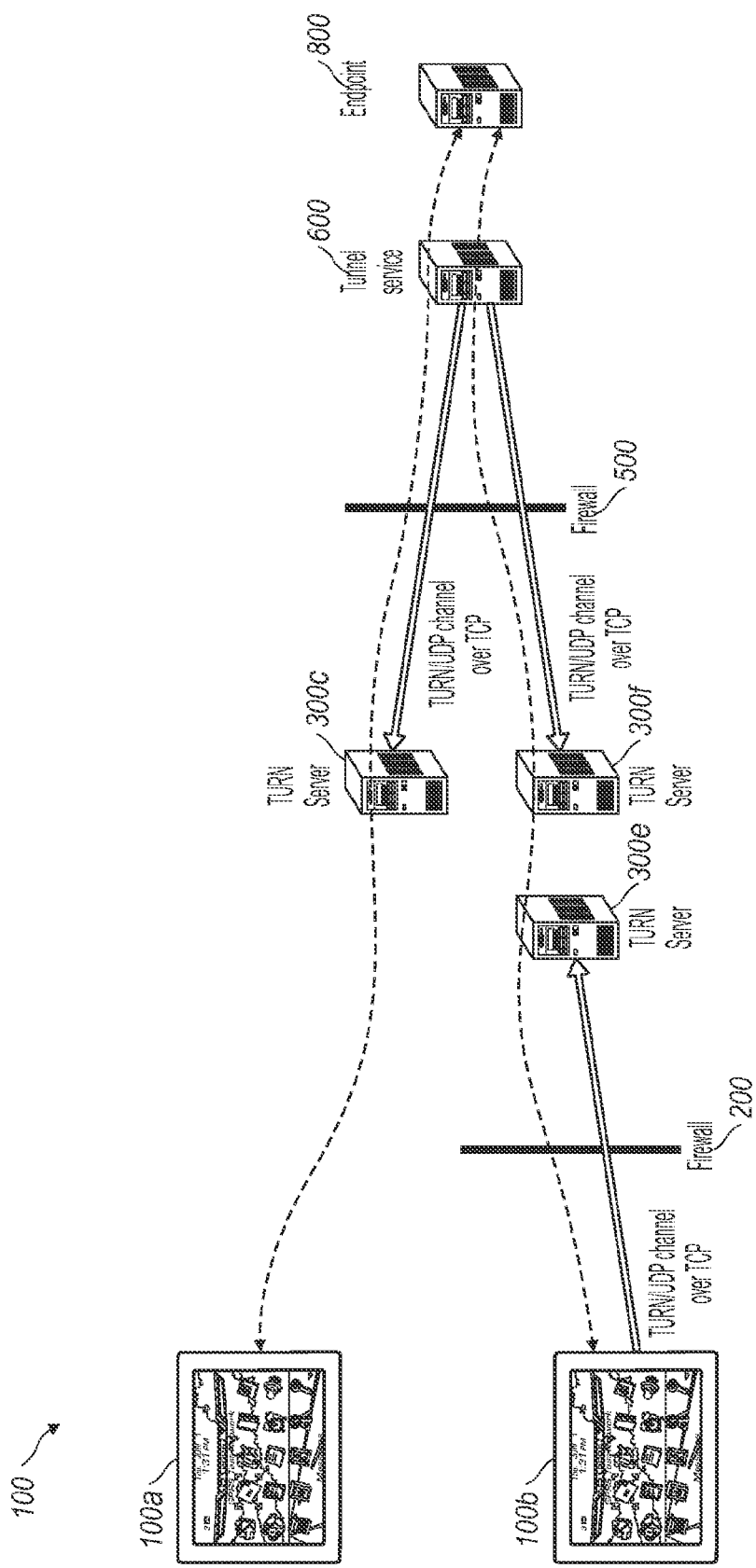
FIG. 9 is a block diagram illustrating the establishment of a secure tunnel and transmission of data over a system in accordance with an exemplary embodiment.

FIG. 9 is a block diagram illustrating the establishment of a secure tunnel and transmission of data over a system in accordance with an exemplary embodiment. The system can include one or more mobile devices 100 and at least one endpoint server 800. As illustrated, the system includes a first mobile device 100a and a second mobile device 100b. While three TURN servers 300c, 300e, and 300f are illustrated, other types of relay servers 300 can be implemented in place of the TURN servers 300c, 300e, and 300f. Additionally, the protocols described in relation to transmission of data are described in relation to communications that the TURN servers 300c, 300e, and 300f are configured to receive. In other embodiments, where different types of relay servers 300 are implemented, other protocols and communication standards can be implemented.

As illustrated the first mobile 100a can be communicatively coupled to a first TURN server 300c. As illustrated, there is no firewall located between the first communication device and the TURN server 300*c*. A firewall 200 can be located between the mobile device 100 and the relay server 300. As illustrated, a firewall 200 can located between the second mobile device 100*b* and the second TURN server 300*e*. When the firewall 200 is located between the second mobile device 100*b*, the second mobile device 100*b* can communicate with the second TURN server 300*e* using a TURN/UDP channel over TCP. As indicated above, when another relay server 300 is implemented in place of the TURN server 300*e*, the channel can be a different channel that the relay server 300 is configured to accept. The TURN/UDP channel is capable of allowing communication from the second mobile device 300*b* to the TURN server 300*e* through the firewall 200.

Additionally, the endpoint server 800 and the tunnel service server 600 can be located on an opposite side of a firewall 500 relative to the first TURN server 300*c* and the third TURN server 300*f*. As illustrated, the endpoint server 800 can be configured to be communicatively coupled to the tunnel service server 600. The tunnel service server 600 can be communicatively coupled to the first TURN server 300*c* and the third TURN server 300*f* over respective TURN/UDP channels over TCP. The respective TURN/UDP channels allow for communication to be transmitted by the tunnel service server 600 through the firewall 500 to the respective TURN server 300*c*, 300*f*.

Figure 10:
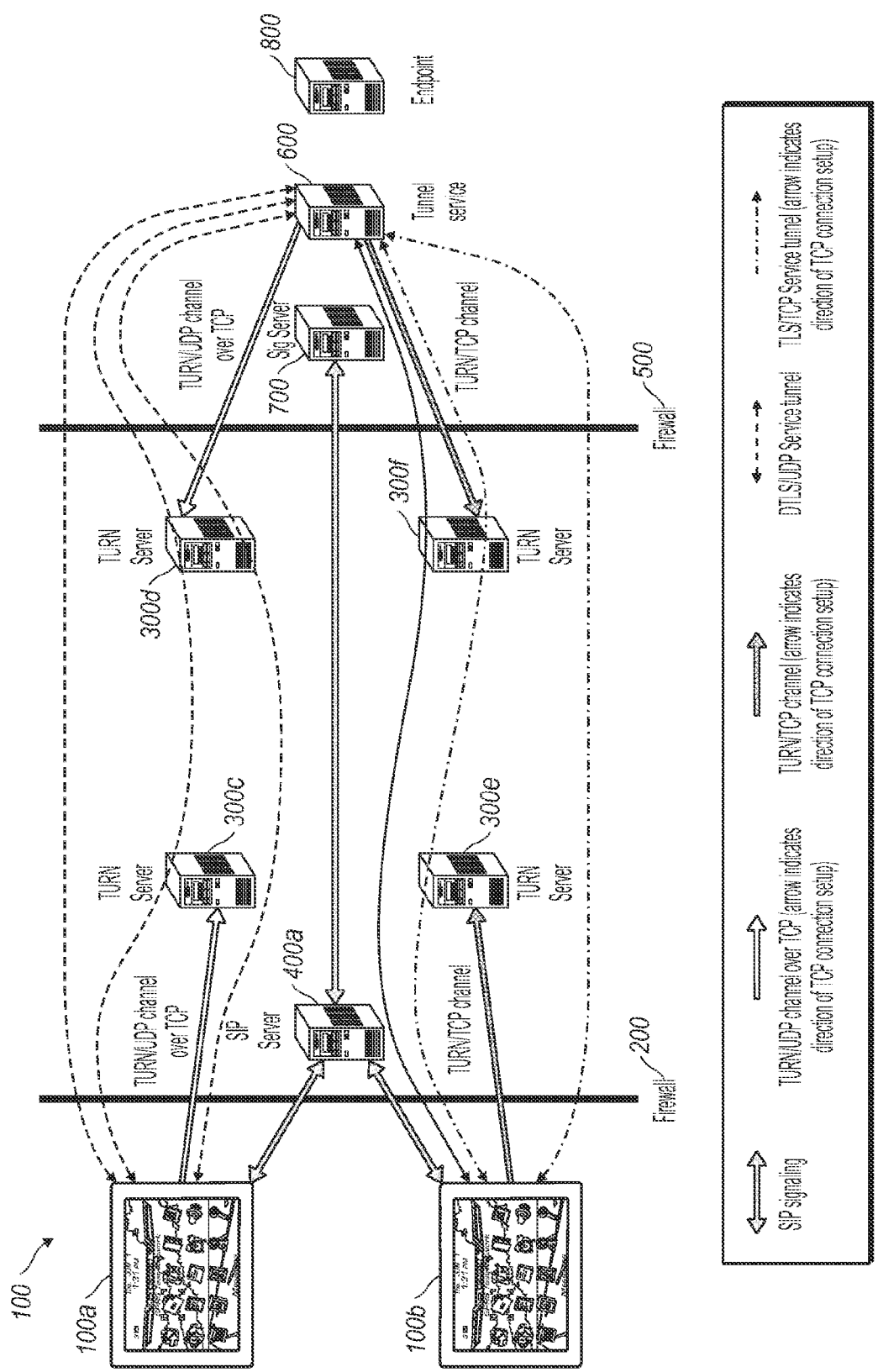
FIG. 10 is another block diagram illustrating the establishment of a secure tunnel and transmission of data over a system in accordance with an exemplary embodiment.

FIG. 10 is another block diagram illustrating the establishment of a secure tunnel and transmission of data over a system in accordance with an exemplary embodiment. As illustrated, the system includes one or more mobile devices 100, one or more TURN servers 300, a SIP server 400*a*, a device firewall 200, an enterprise firewall 500, a signaling server 700, a tunnel service server 600 and an endpoint server 800. As illustrated, the one or more mobile devices include a first mobile device 100*a* and a second mobile device 100*b*.

As illustrated the SIP server 400*a*, which is a type of discovery server 400 as indicated above, can be configured to be communicatively coupled to the signaling server 700, the first mobile device 100*a* and the second mobile device 100*b*. The SIP server 400*a* can be configured to allow SIP signaling communication data to be transmitted between the first mobile device 100*a* located on an opposite side of a mobile device firewall 200 from the SIP server 400*a*. Similarly, the SIP server 400*a* can be configured to allow SIP signaling communication data to be transmitted between the second mobile device 100*b* located on an opposite side of a mobile device firewall 200 from the SIP server 400*a*. Additionally, the SIP server 400*a* can exchange SIP signaling communication data with the signaling server 700. The SIP signaling communication data can include data that that is later used in establishing the TURN/UDP channel over TCP. The SIP signaling communication data can include transmission of data containing the address information for one or more electronic devices within the system. For example the SIP signaling communication data can include address information for the first mobile device 100*a*, the second mobile device 100*b*, and/or the tunnel service server 600. The address information can be used in establishing the communication channels. Specifically, using the address information discovered in the SIP signaling communication data, the data channels can be set up to have an optimal bearer path. In determining the optimal bearer path, the tunnel manager module 120 first determines if it is possible to establish a direct connection to the tunnel service server 600. If it is not possible to establish a direct connection, then the tunnel manager module 120 establishes a connection via one or more relay servers 300 to the tunnel service manager 600 so that the number of relay servers 300 involved is minimized.

As illustrated, both the first mobile device 100*a* and the second mobile device 100*b* are located on an opposite side of a device firewall 200 relative to a first TURN server 300*c* and a second TURN server 300*e*. As illustrated, the first mobile device 100*a* can setup a TURN/UDP channel over TCP with the first TURN server 300*c*. As illustrated the setup of the TURN/UDP channel over TCP originates at the first mobile device 100*a* and goes through the mobile device firewall 200 to the first TURN server 300*c*. Once the setup is complete, the first mobile device 100*a* and the first TURN server 300*c* can communicate via a DTLS/UDP service tunnel through the device firewall 200. The DTLS/UDP service tunnel allows for two way communication between the first TURN server 300*c* and the mobile device 100*a*. Thus, communication can originate at either the first TURN server 300*c* or the first mobile device 100*a* and be transmitted to the corresponding one first mobile device 100*a* and the first TURN server 300*c*. Similarly, the second mobile device 100*b* can establish a TURN/TCP channel through the device firewall 200 to the second TURN server 300*e*.

The tunnel service server 600 can also establish TURN UDP channel over TCP or TURN/TCP channels.

While the above examples are provided in relation to TURN servers and the associated communication standards, the data communication can be based on the type of relay server 300 that is implemented. As indicated above, the data communication can be a proprietary data communication protocol. As illustrated, the tunnel service server 600 can establish a TURN/UDP channel over TCP to the third TURN server 300*d*. The tunnel service server 600 can also establish a TURN/TCP channel to the fourth TURN server 300*f*.

FIG. 10 also illustrates two different tunnels that are established and the ability of data to flow between various devices of the system in the respective tunnels. As illustrated, three tunnels can be established between the first mobile device 100*a* and the tunnel service server 600. The tunnels illustrated between the first mobile device 100*a* and the tunnel service server 600 can be DTLS/UDP service tunnels. A first one of the DTLS/UDP tunnels (the middle one as illustrated) starts at the first mobile device 100*a* and traverses the mobile device firewall 200. The first one of the DTLS/UDP tunnels then proceeds to the first TURN server 300*c*. From the first TURN server 300*c* the first one of the DTLS/UDP tunnels proceeds to the third TURN server 300*d*. Then, the first one of the DTLS/UDP tunnels proceeds from the third TURN server 300*d* to the tunnel service server 600. A second one of the DTLS/UDP tunnels (the bottom one as illustrated) takes a path similar for the first one with one deviation. The second one of the DTLS/UDP tunnels starts at the first mobile device 100*a* and traverses the mobile device firewall 100. The second one of the DTLS/UDP tunnels bypasses the first TURN server 300*c* and proceeds directly to the third TURN server 300*d*. From the third TURN server 300*d*, the second one of the DTLS/UDP tunnels proceeds through the enterprise firewall 500 to the tunnel service server 600. In the third one of the DTLS/UDP tunnels, the tunnel does not pass through either the first TURN server 300*c* or the third TURN server 300*d*. The third one of the DTLS/UDP tunnels can be established from the first mobile device 100*a* through the mobile device firewall 200 and then through the enterprise firewall 500 to the tunnel service server 600.

FIG. 10 also illustrates TLS/TCP tunnels. While TLS/TCP tunnels are illustrated other types of tunnels are considered within the scope of this disclosure. The presentation of TLS/TCP tunnels is illustrative and can be modified in dependence upon the selected protocols. The TLS/TCP tunnels are illustrated in relation to the second mobile device 100b and the tunnel service server 600. Two different TLS/TCP tunnels are illustrated. In the first illustrated TLS/TCP tunnel, the tunnel begins at the second mobile device 100b and proceeds through the mobile device firewall 200 to the second TURN server 300e. From the second TURN server 300e the tunnel proceeds to the fourth TURN server 300f. The first TLS/TCP tunnel continues from the fourth TURN server 300f to through the enterprise firewall to the tunnel service server 600. The second TLS/TCP tunnel begins at the second mobile device 100b and proceeds through the mobile device firewall 200 and the enterprise firewall 500 before passing to the tunnel service server 600. The second TLS/TCP tunnel does not pass through any of the TURN servers, specifically the second TURN server 300e and fourth TURN server 300f.

While the tunnels have been described as beginning at the respective mobile device 100a, 100b, the tunnels do not require the data to flow from the mobile device to the tunnel service server 600. Data can flow in both directions. Furthermore, data sometimes might travel along only a portion of any one of the above described tunnels. While five examples of tunnels have been provided along with the electronic devices that the tunnels pass through, other examples may include additional electronic devices. FIG. 10 does not illustrate all of the components of the system that are implemented to pass data through the system.

Figure 11:
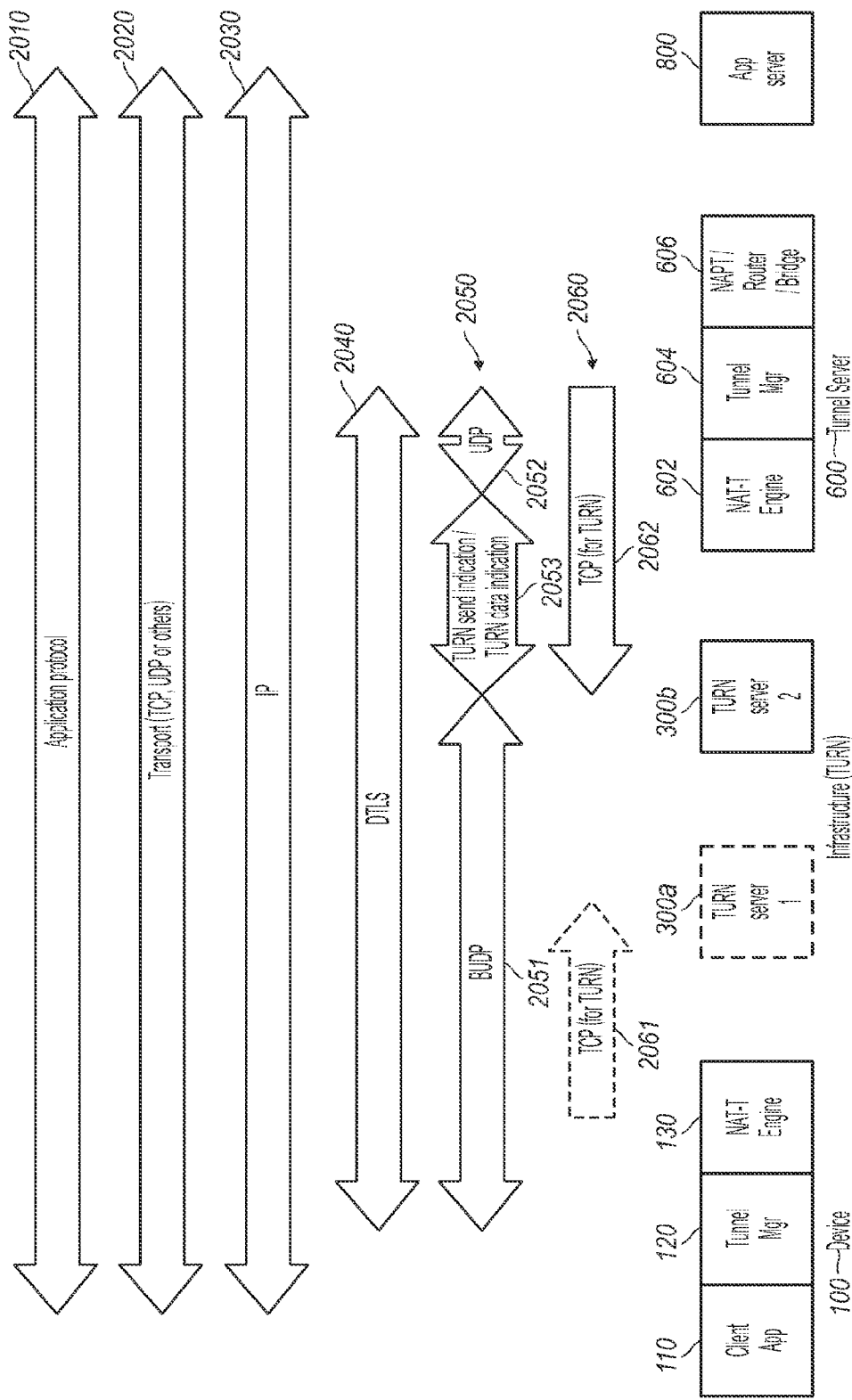
FIG. 11 is a functional chart illustrating levels of communication in accordance with an exemplary embodiment.

FIG. 11 is a functional chart illustrating levels of communication in accordance with an exemplary embodiment. In one or more embodiments, the embodiment in FIG. 11 can be performed after the connection is established. As illustrated, there are several different layers of data communication possible between different components of the system. Some of the components of the system are labeled at the bottom of the chart, namely the mobile device 100, a first TURN server 300a, a second TURN server 300b, a tunnel server 600, and an endpoint server 800. As illustrated the mobile device can include a client application module 110, a tunnel manager module 120, and a NAT-T engine module 130. The two TURN servers can be a part of the infrastructure. The tunnel server 600 can include a NAT-T engine module 602, a tunnel manager module 604, and a NAPT/Router/Bridge module 606. The NAPT/Router/Bridge module is configured to allow for connection to one or more endpoint servers 800. While the above components have been identified, the presently presented system can include one or more of the above components. In yet other embodiments, the system can include components that are not described above.

As illustrated, the application protocol 2010 spans across all of the above described components. Likewise, the transport protocol 2020 spans across all of the above described components. The transport protocol 2020 can be selected as indicated above. For example, the transport protocol 2020 can include a TCP or a UDP. Additionally, the IP 2030 can span across all of the components.

The DTLS function 2040 can be configured to apply only to a selected number of the components. For example as shown, the DTLS function 2040 cooperates with the tunnel manager module 120 of the mobile device 100 and the tunnel manager module 604 of the tunnel service server 600. The intervening components implement functions of other lower layer protocols to transmit DTLS data between the tunnel manager module 120 of the mobile device 100 and the tunnel manager module 604 of the tunnel service server 600. For example, as illustrated the intervening components can include the NAT-T engine module 130, the TURN servers 300, and the NAT-T engine module 602.

Another level 2050 comprises several different functions. Specifically, level 2050 can include a BUDP function 2051, a TURN send indication/TURN data indication 2053, and a UDP function 2052. The BUDP function 2051 operates on the tunnel manager module 120 and the second TURN server 300b. The BUDP function 2051 provides for the transmission of BUDP data across intervening components between the tunnel manager module 120 and the second TURN server 300b. The intervening components as illustrated include the NAT-T engine 130. The TURN send indication/TURN data indication 2053 operates on the NAT-T engine and the second TURN sever 300b. The UDP function operates on the tunnel manger 604 and the NAT-T engine 602 to provide for a data connection therebetween.

In yet another layer 2060, the TCP TURN function is provided. As indicated, the establishment of the TCP connection is in an outbound direction. Thus, the TCP connection establishment can proceed through the firewall as outbound traffic is permitted. A first TCP function 2061 can be provided between the NAT-T engine module 130 of the mobile device 100 and the first TURN server 300a. A second TCP function 2062 can be provided such that it cooperates with the tunnel manager module 604 and the NAT-T engine module 602 of the tunnel server 600, and the second TURN server 300b.

Figure 12:
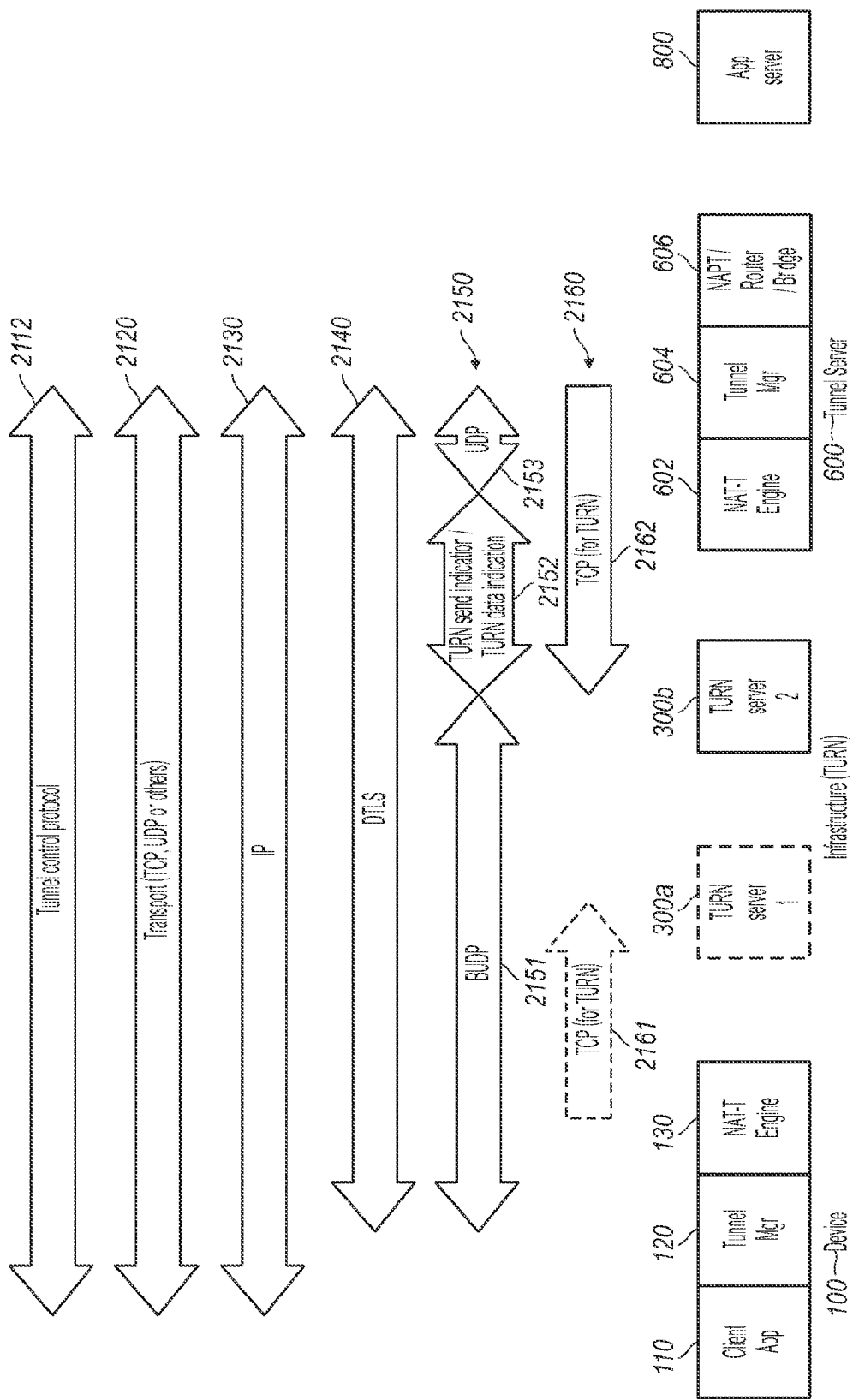
FIG. 12 is a functional chart illustrating levels of communication in accordance with an exemplary embodiment.

FIG. 12 is a functional chart illustrating levels of communication in accordance with an exemplary embodiment. The functional chart illustrated in FIG. 12 is similar to the functional chart presented in FIG. 11 with some deviations regarding the number of components involved and at least one different function. In one or more embodiments, the functional chart of FIG. 12 can be used to establish the connection.

Some of the components of the system are labeled at the bottom of the chart, namely the mobile device 100, a first TURN server 300a, a second TURN server 300b, a tunnel server 600, and an endpoint server 800. As illustrated the mobile device 100 can include a client application module 110, a tunnel manager module 120, and a NAT-T engine module 130. The two TURN servers 300a, 300b can be a part of the infrastructure. The tunnel server 600 can include a NAT-T engine module 602, a tunnel manager module 604, and a NAPT/Router/Bridge module 606. The NAPT/Router/Bridge module is configured to allow for connection to one or more endpoint servers 800. While the above components have been identified, the presently presented system can include one or more of the above components. In yet other embodiments, the system can include components that are not described above.

As illustrated, the tunnel control protocol 2112 spans across a select number of components. The tunnel control protocol 2112 spans across the following components, the mobile device 100, the first TURN server 300a, the second TURN server 300b, and the tunnel server 600. However, in at least one embodiment such as the one illustrated, the tunnel protocol 2112 can only span across a few of the components of the mobile device 100 and the tunnel server 600. As illustrated the tunnel control protocol 2112 spans across the tunnel manager module 120 and the NAT-T engine module 130 of the mobile device 100. Additionally, the tunnel control protocol 2112 spans across the NAT-T engine 602 and the tunnel manager 604 of the tunnel server 600.

Likewise, the transport protocol 2120 can span across the same components that the tunnel control protocol 2112 spans across. The transport protocol 2020 can be selected as indicated above. For example, the transport protocol 2020 can include a TCP or a UDP. Additionally, the IP 2130 can span across the same components that the tunnel control protocol 2112 spans across.

The DTLS function 2140 can be configured to apply only to a selected number of the components. For example as shown, the DTLS function 2140 cooperates with the tunnel manager module 120 of the mobile device and the tunnel manager module 604 of the tunnel service server 600. The intervening components implement functions of other lower layer protocols to transmit DTLS data between the tunnel manager module 120 of the mobile device and the tunnel manager module 604 of the tunnel service server 600. For example, as illustrated the intervening components can include the NAT-T engine module 130, the TURN servers 300, and the NAT-T engine module 602.

Another level 2150 comprises several different functions. Specifically, level 2150 can include a BUDP function 2151, a TURN send indication/TURN data indication 2152, and a UDP function 2153. The BUDP function 2151 operates on the tunnel manager module 120 and the second TURN server 300b. The BUDP function 2151 provides for the transmission of BUDP data across intervening components between the tunnel manager module 120 and the second TURN server 300b. The intervening components as illustrated include the NAT-T engine 130. The TURN send indication/TURN data indication 2152 operates on the NAT-T engine and the second TURN sever 300b. The UDP function operates on the tunnel manger 604 and the NAT-T engine 602 to provide for a data connection therebetween.

In yet another layer 2160, the TCP TURN function is provided. As indicated, the establishment of the TCP connection is in an outbound direction. Thus, the TCP connection establishment can proceed through the firewall as outbound traffic is permitted. A first TCP function 2161 can be provided between the NAT-T engine module 130 of the mobile device 100 and the first TURN server 300a. A second TCP function 2162 can be provided such that it cooperates with the tunnel manager module 604 and the NAT-T engine module 602 of the tunnel server 600, and the second TURN server 300b.

Figure 13:
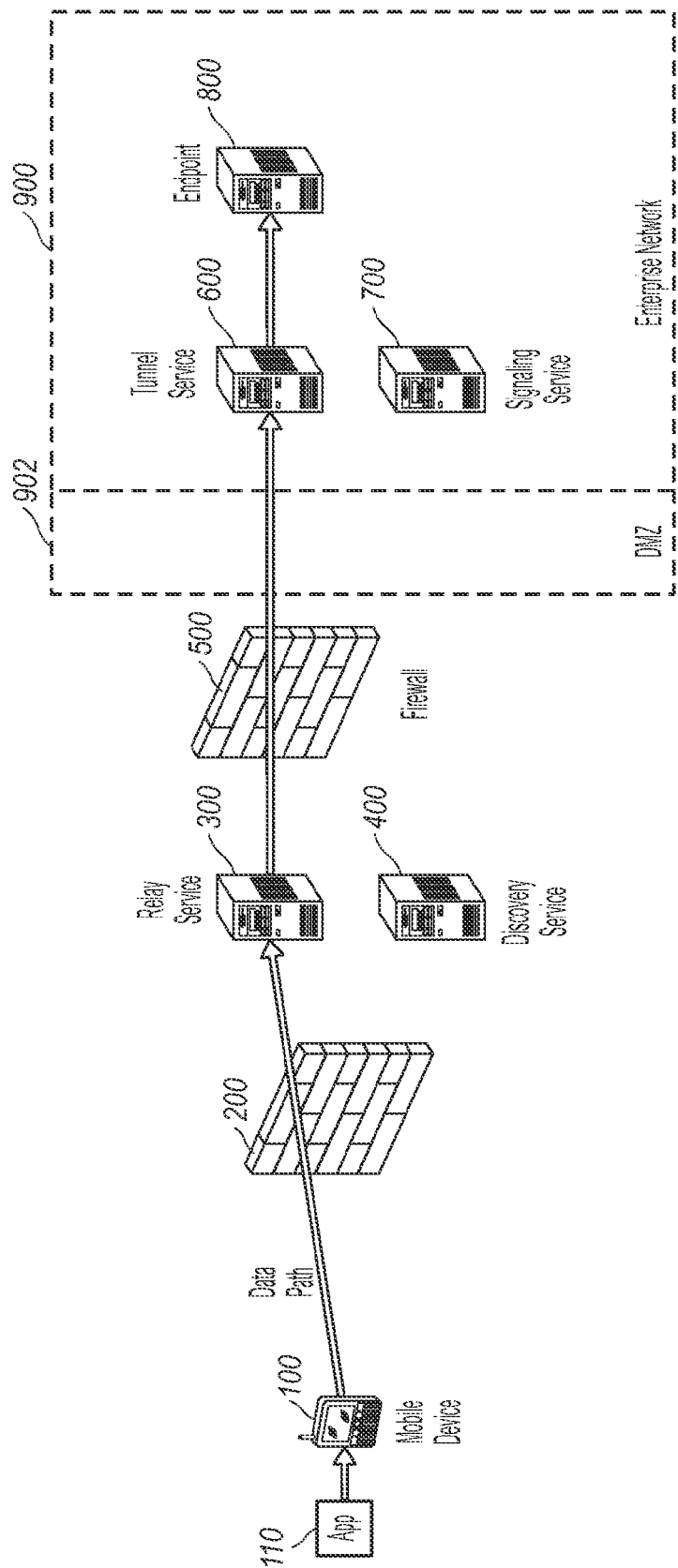
FIG. 13 is a block diagram illustrating the transmission of data between an application on a mobile device and an endpoint server in accordance with an exemplary embodiment.

FIG. 13 is a block diagram illustrating the transmission of data between an application on a mobile device 100 and an endpoint server 800 in accordance with an exemplary embodiment. The block diagram illustrates the communication of application data from the mobile device 100 and the endpoint server 800. Prior to the transmission of data, the present disclosure can include setting up the data channels over which the data can be transmitted in accordance with one or more of the above described methods or systems.

As illustrated in FIG. 13, an application executing on the mobile device 100 can receive a request to transmit data to endpoint server 800 which is located on an enterprise network 900.

The system can also include a tunnel service server 600 and a signaling service server 700, a relay service server 300, and a discovery service server 400. An enterprise firewall 500 can be located just outside a DMZ 902. The enterprise firewall 500 can be located between the tunnel service server 600 and the relay service server 300. The relay service server 300 can be a TURN server such as the ones described above. In other embodiments, the relay service server 300 can be other relay servers as mentioned herein. The endpoint server 800, the tunnel service server 600 and the signaling service server can be located in an enterprise network 900. In at least one embodiment, the tunnel service server 600 and the endpoint server 800 are located on a single server.

The tunnel service server 600 can be communicatively coupled to an endpoint server 800. The relay server 300 can be communicatively coupled to the tunnel service server 300 and further communicatively coupled to a mobile device 100.

The mobile device 100 can be configured to determine an optimal bearer path based upon the offered addresses from the mobile device and a set of offered addresses on the enterprise endpoint server 800. The mobile device 100 can be further configured to establish a secure tunnel over the optimal bearer path between the mobile device and the endpoint server 800. The mobile device 100 can be configured to transmit application data from the mobile device 100 to the endpoint server 800 through the secure tunnel. The mobile device 100 can be configured to create a first packet. The mobile device 100 can be configured to encrypt the application data prior to creating the first packet. The first packet can further be created to include address data for at least the endpoint. The first packet can also include address information for the relay service server 300.

The mobile device 100 can be configured as described above and include a tunnel manger module, a NAT-T engine module and an application module 110. The tunnel manager module can be configured to store instructions for execution by a processor of the mobile device to create the first packet and encrypt the encrypted application data.

The relay server 300 can be configured to open the first packet from the mobile device 100 to determine a destination address. The relay server 300 can be further configured to repackage the encrypted application data, the source address and the destination address into a second packet. The relay server 300 can be further configured to transmit the second packet to the tunnel service server 600.

The tunnel service server 600 can be configured to receive the second packet from the relay server 300 through a secure tunnel established between the tunnel service server 600 and the relay server 300, wherein the transmission allows for the traversal of one or more firewalls 500 located between the tunnel service server 600 and the relay server 300. The tunnel service server 600 can be configured to transmit application data to the endpoint server 800. The tunnel service server 600 can also be configured to decrypt the application data prior to sending the application data to the endpoint server 800. Still further the tunnel service server 600 can be configured to unpackage the encrypted application data together with a source address and a destination prior to transmission of the application data to the endpoint server 800.

As illustrated, the tunnel service server 600 and the endpoint server 800 can be located within an enterprise network 900 which is isolated from the internet by the one or more firewalls 500. Additionally, the signaling service server 700, located within the enterprise network 900, can be configured to obtain internal address information for the endpoint server 800. The internal address information can be the address for the endpoint server 800.

The discovery service server 400 can be located outside of the enterprise network 900. The discovery service server can be communicatively coupled with the signaling service server 700 and the mobile device 100. The discovery service server 400 can be communicatively coupled to the relay server 300. The discovery service server 400 in cooperation with the signaling service server 700 can determine destination addresses and source addresses to be used in packaging of the encrypted data.

The mobile device 100 can be coupled to an enterprise endpoint server 800. The mobile device 100 can be configured to receive a request to establish a connection to the enterprise endpoint server 800 and to transmit the request including a set of offered addresses based upon data received from a discovery service server 400. The discovery service server 400 can be in data communication with an enterprise signaling server 700. The discovery service server 400 can be located on a first side of an enterprise firewall 500 and the enterprise signaling server 700 can be located on a second side of the enterprise firewall 500. The relay service server 300 can be configured to receive data from the mobile device 100. The relay service server 300 can be located on an opposite side of a mobile device firewall 200 from the mobile device 100.

The enterprise tunnel service server 600 can be in data communication with the relay service server 300 located on an opposite side of the enterprise firewall 500. The enterprise signaling server 700 and enterprise tunnel server 600 can be located on the same side of the enterprise firewall 500 along with the enterprise endpoint server 800.

Figure 14:
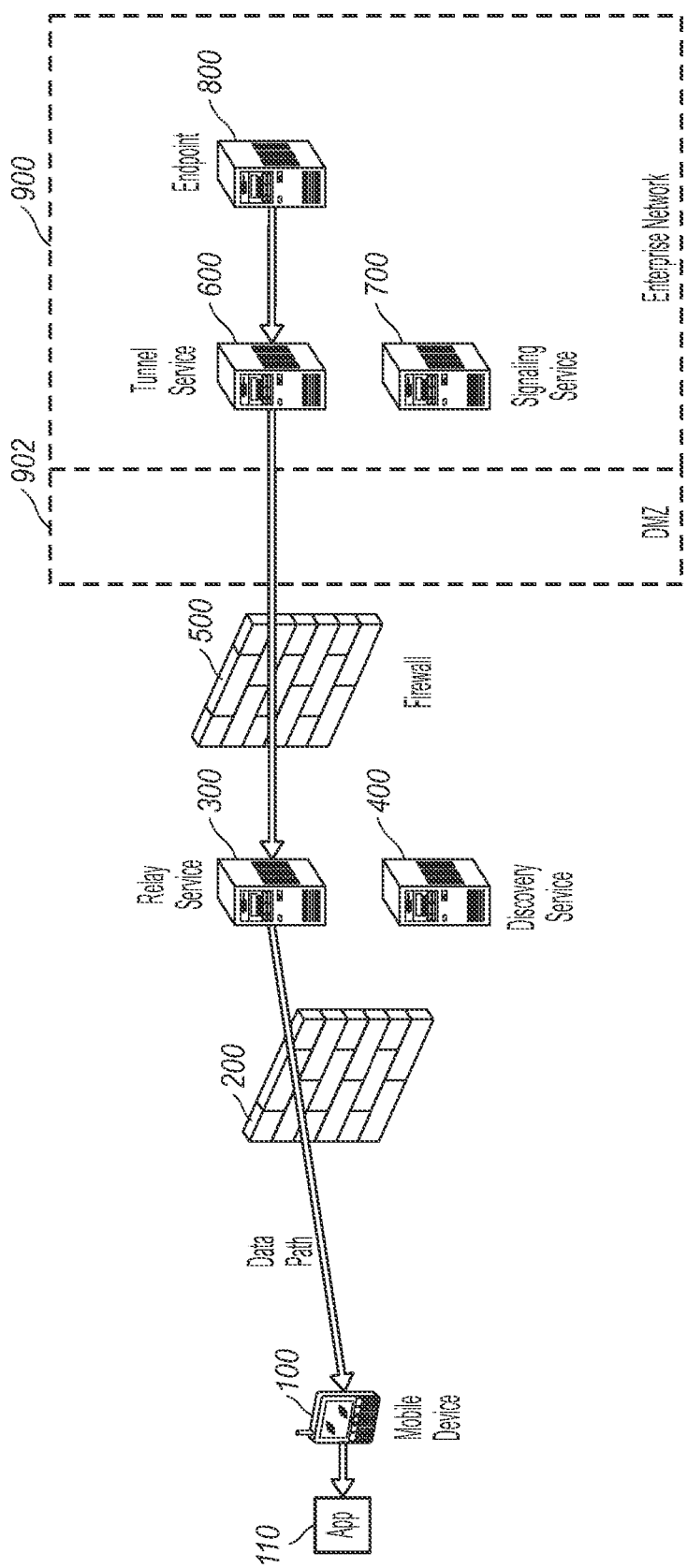
FIG. 14 is a block diagram illustrating the transmission of data between an endpoint server and an application on the mobile device in accordance with an exemplary embodiment.

FIG. 14 is a block diagram illustrating the transmission of data between an endpoint server 800 and an application 110 on the mobile device 100 in accordance with an exemplary embodiment. The system can also include a tunnel service server 600 and a signaling service server 700, a relay service server 300, and a discovery service server 400. An enterprise firewall 500 can be located just outside a DMZ 902. The enterprise firewall 500 can be located between the tunnel service server 600 and the relay service server 300. The relay service server 300 can be a TURN server such as the ones described above. In other embodiments, the relay service server 300 can be other relay servers as mentioned herein. The endpoint server 800, the tunnel service server 600 and the signaling service server 700 can be located in an enterprise network 900. In at least one embodiment, the tunnel service server 600 and the endpoint server 800 are located on a single server.

The tunnel service server 600 can be communicatively coupled to an endpoint server 800. The relay server 300 can be communicatively coupled to the tunnel service server 600 and further communicatively coupled to a mobile device 100. The tunnel service server 600 can be configured to receive application data from the endpoint server 800. The tunnel service server 600 can also be configured to encrypt the application data. Still further the tunnel service server 600 can be configured to package the encrypted application data together with a source address and a destination in a first packet. Additionally, the tunnel service server 600 can be configured to transmit the first packet to the relay server 300 through a secure tunnel established between the tunnel service server 600 and the relay server 300, wherein the transmission allows for the traversal of one or more firewalls 500 located between the tunnel service server 600 and the relay server 300.

The relay server 300 can be configured to open the first packet to determine a destination address. The relay server 300 can be further configured to repackage the encrypted application data, the source address and the destination address into a second packet. The relay server 300 can be further configured to transmit the second packet to the mobile device 100.

The mobile device 100 can be configured to receive the second packet and open the second packet. The mobile device 100 can be configured to decrypt the application data and process the application data.

As illustrated, the tunnel service server 600 and the endpoint server 800 can be located within an enterprise network 900 which is isolated from the internet by the one or more firewalls 500. Additionally, the signaling service server 700, located within the enterprise network 900, can be configured to obtain internal address information for the endpoint server 800. The internal address information can be the source address for the tunnel service server 600 or the endpoint server 800.

The discovery service server 400 can be located outside of the enterprise network 900. The discovery service server can be communicatively coupled with the signaling service server 700 and the mobile device 100. The discovery service server 400 can be communicatively coupled to the relay server 300. The discovery service server 400, in cooperation with the signaling service server 700, determines destination addresses and source addresses to be used in packaging of the encrypted data.

The mobile device 100 can be configured as described above and can include a tunnel manger module, a NAT-T engine module 130 and an application module 110. The tunnel manager module can be configured to store instructions for execution by a processor 114 of the mobile device 100 to open the second packet and decrypt the encrypted application data. The application module 110 can be configured to store instructions to process the decrypted application data.

The present disclosure further contemplates that a system can be configured as follows. The mobile device 100 can be coupled to an enterprise endpoint server 800. The mobile device 100 can be configured to receive a request to establish a connection to the enterprise endpoint server 800 and to transmit the request including a set of offered addresses based upon data received from a discovery service server 400. The discovery service server 400 can be in data communication with an enterprise signaling service server 700. The discovery service server 400 can be located on a first side of an enterprise firewall 500 and the enterprise signaling service server 700 can be located on a second side of the enterprise firewall 500. The relay service server 300 can be configured to receive data from the mobile device 100. The relay service server 300 can be located on an opposite side of a mobile device firewall 200 from the mobile device 100.

The enterprise tunnel service server 600 can be in data communication with the relay service server 300 located on an opposite side of the enterprise firewall 500. The enterprise signaling service server 700 and enterprise tunnel service server 600 can be located on the same side of the enterprise firewall 500 along with the enterprise endpoint server 800. The mobile device 100 can be configured to determine an optimal bearer path based upon the offered addresses from the mobile device 100 and a set of offered addresses on the enterprise endpoint server 800. The mobile device 100 can be further configured to establish a secure tunnel over the optimal bearer path between the mobile device 100 and the endpoint server 800. The mobile device 100 can be further configured to transmit application data from the endpoint to the mobile device 100 through the secure tunnel. Still further, the mobile device 100 can be configured to transmit application data from the mobile device 100 to the endpoint server 800 through the secure tunnel.

While the details of transmitting of information from one of the above electronic devices to another electronic device have not been discussed in detail, the transmission of data can be implemented via a communication module. For example, the communication module can be a wireless transmitter or receiver or a combination transmitter/receiver. Examples of the types of wireless communication include cellular networks, WIFI networks, and short range wireless networks. In other embodiments, a wired transmitter or receiver or a combination transmitter/receiver can be implemented. Additionally, a combination of wired and wireless communication devices can be implemented. The transmitted data can be formatted prior to the transmission according to the disclosure recited herein.

Figure 15:
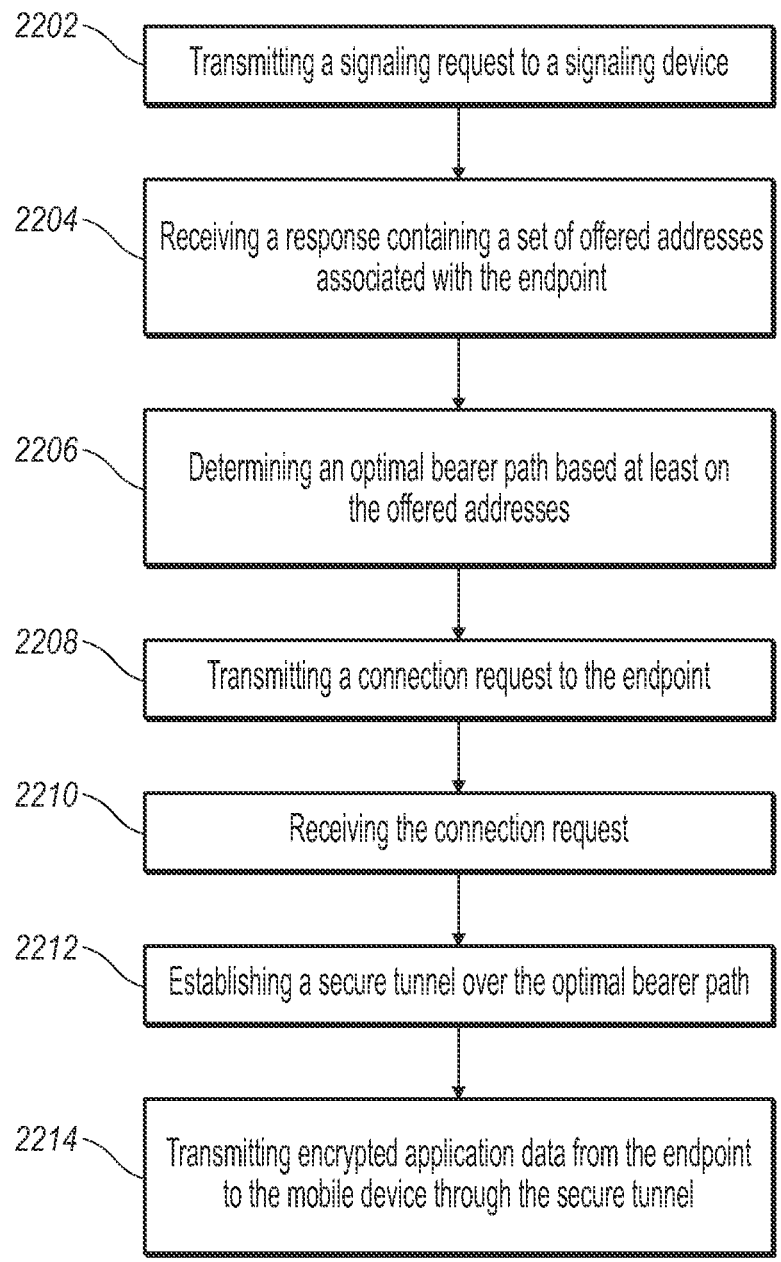
FIG. 15 is a flow chart illustrating a method to establish a secure connection between a server and a computing device in accordance with an exemplary embodiment.

FIG. 15 is a flow chart illustrating a method 2200 to establish a secure connection between a server 800 and a mobile device 100 in accordance with an exemplary embodiment. The method provides for establishing a secure internet protocol tunnel over a telecommunications network between a mobile device 100 and a tunnel service server 600 behind a firewall 500 in an enterprise network 900. The data sent over the secure IP tunnel is encrypted from the mobile device 100 to the tunnel service server 600.

The exemplary method 2200 is provided by way of example, as there are a variety of ways to carry out the method. The method 2200 described below can be carried out using a system including one or more components as described herein. Various elements of other figures presented are referenced in explaining the exemplary method 2200. Each block shown in FIG. 15 can represent one or more processes, methods, or subroutines carried out in the exemplary method.

The exemplary method 2200 can begin at block 2202. At block 2202, the mobile device 100 transmits a signaling request to a signaling service device 700 in the enterprise network 900. The signaling service device 700 can be behind an enterprise firewall 500. After transmitting a signaling request to a signaling device, the method 2200 can proceed to block 2204.

At block 2204, the mobile device 100 receives from the signaling service device 700 a response containing a set of offered addresses associated with the tunnel service server 600. After receiving the response containing a set of offered addresses, the method 2200 can proceed to block 2206.

At block 2206, the endpoint determines an optimal bearer path based at least upon the offered addresses from the mobile device and the set of offered addresses on the tunnel service server 600. After determining the optimal bearer path, the method 2200 can proceed to block 2208.

At block 2208, the mobile device 100 transmits a connection request to the tunnel service server 600. The connection request contains a set of offered addresses from the mobile device 100 to establish a connection to the tunnel service server 600. After transmitting a signaling request to a signaling device, the method 2200 can proceed to block 2210.

At block 2210, the endpoint receives the connection request. After receiving the connection request, the method 2200 can proceed to block 2212.

At block 2212, the system establishes a secure tunnel over the optimal bearer path between the mobile device 100 and the tunnel service server 600. After transmitting a signaling request to a signaling device, the method 2200 can proceed to block 2214. The packet can include a source address and a destination address. The destination address can be an address associated with the mobile device 100.

At block 2214, the system transmits the encrypted application data from the tunnel service server 600 to the mobile device 100 through the secure tunnel, such that the encrypted data remains encrypted from the tunnel service server 600 to the mobile device 100, wherein the encrypted application data is packaged in one or more first data packets. In at least one embodiment, the transmitting of the encrypted application data can include packaging the encrypted application data into packets according to a protocol for transmission to an external device. In at least one embodiment, the transmitting the encrypted application data in the one or more first data packets can include transmitting from the endpoint 800 through a tunnel service device 600 to the mobile device 100. The tunnel service device 600 can be located between the endpoint 800 and a first firewall 500. The method can further include transmitting the encrypted application data in the one or more first data packets from the tunnel service device 600 through the firewall 500 to a relay service device 300.

The method can further include unpackaging, at the relay service device 300 the encrypted application data in the one or more first data packets and repackaging the encrypted application data in one or more second data packets. The one or more second data packets can be addressed to the mobile device 100. The method can further include transmitting the encrypted application through a second firewall 200 located between the relay service device 300 and the mobile device 100.

When the packet is received at the mobile device 100, the method can further include executing instructions stored on a NAT-T engine module 130 to further process, based upon the address instructions, the received packet. In at least one embodiment, the mobile device 100 can include a tunnel manager module 120 which acts upon the encrypted application data from the NAT-T engine module 130. The tunneling manager module 120 can include instructions for the processor to unpackage the one or more second data packets; decrypt the encrypted application data that was contained in the one or more second data packets; and process the decrypted application data based on instructions stored in an application module 110. The application data itself can be encrypted. Application data can be any data that is used by an application.

In at least one embodiment, the mobile device can only include a tunneling manger module 120 and not include the NAT-T engine 130. In such a configuration, the method can include receiving, by a tunneling manager module 120 operating on the mobile device 100, the encrypted application data in one or more second data packets. The tunneling manager module 120 can further unpack the one or more second data packets. The tunneling manager module 120 can decrypt the encrypted application data and providing the unencrypted application data to an application module 110 operating on the mobile device 100.

The various embodiments described above are provided by way of illustration only and should not be construed to limit the scope of the disclosure. The present disclosure applies to computing devices which are capable of connecting to one or more endpoints that are located behind one or more firewalls. The present technology also includes the endpoints that are located behind the one or more firewalls. Those skilled in the art will readily recognize various modifications and changes that may be made to the principles described herein without following the example embodiments and applications illustrated and described herein, and without departing from the scope of the disclosure.

What is claimed is:

1. A method for establishing a secure internet protocol (IP) tunnel over a telecommunications network between a mobile device and a tunnel service server behind a firewall in an enterprise network, the method comprising:
  transmitting, from the mobile device, a signaling request to a signaling service device in the enterprise network, the signaling service device being behind the enterprise firewall;
  receiving, at the mobile device, from the signaling service device a response, the response containing a first set of offered addresses of the tunnel service server, the first set of offered addresses allocated by one or more relay service servers;
  determining, at the mobile device, an optimal bearer path based at least upon the first set of offered addresses of the tunnel service server, the optimal bearer path associated with at least one of the offered addresses of the first set;
  transmitting, from the mobile device, a connection request to the tunnel service server through the determined optimal bearer path, the connection request containing a second set of offered addresses of the mobile device to establish a connection to the tunnel service server;
  establishing a secure tunnel over the determined optimal bearer path between the mobile device and the tunnel service server, the secure tunnel being through the one or more relay service servers that allocated the first set of offered addresses of the tunnel service server; and
  transmitting encrypted application data from the mobile device to the tunnel service server through the secure tunnel.

2. The method of claim 1, wherein the encrypted application data remains encrypted from the mobile device to the tunnel service server, and the encrypted application data is packaged in one or more first data packets.

3. The method of claim 2, wherein the transmitting the encrypted application data from the mobile device to the tunnel service server comprises transmitting unencrypted application data to an endpoint server.

4. The method of claim 3, wherein the transmitting the encrypted application data from the mobile device to the tunnel service server further comprises transmitting the encrypted application data in the one or more first data packets from the mobile device to the tunnel service server through the one or more relay service servers.

5. The method of claim 4, wherein the relay service server is a TURN server.

6. The method of claim 4, wherein the transmitting the encrypted application data from the mobile device to the tunnel service server further comprises transmitting the encrypted application through a second firewall located between the one or more relay service servers and the mobile device.

7. The method of claim 2, wherein the transmitting the encrypted application data comprises packaging the encrypted application data into packets according to a protocol for transmission to an external device.

8. The method of claim 1, wherein the first set of offered addresses differ at least in part from the second set of offered addresses.

9. A mobile device configured to establish a secure internet protocol (IP) tunnel over a telecommunications network between the mobile device and a tunnel service server behind a firewall in an enterprise network, the mobile device configured to:
  transmit a signaling request to a signaling service device in the enterprise network, the signaling service device being behind the enterprise firewall;
  receive from the signaling service device a response, the response containing a first set of offered addresses of the tunnel service server, the first set of offered addresses allocated by one or more relay service servers;
  determine an optimal bearer path based at least upon the first set of offered addresses of the tunnel service server, the optimal bearer path associated with at least one of the offered addresses of the first set;
  transmit a connection request to the tunnel service server through the determined optimal bearer path, the connection request containing a second set of offered addresses of the mobile device to establish a connection to the tunnel service server;
  establish a secure tunnel over the determined optimal bearer path between the mobile device and the tunnel service server, the secure tunnel being through the one or more relay service servers that allocated the first set of offered addresses of the tunnel service server; and
  transmit encrypted application data from the mobile device to the tunnel service server through the secure tunnel.

10. The mobile device of claim 9, wherein the encrypted application data remains encrypted from the mobile device to the tunnel service server, and the encrypted application data is packaged in one or more first data packets.

11. The mobile device of claim 10, wherein the transmitting the encrypted application data from the mobile device to the tunnel service server comprises transmitting unencrypted application data to an endpoint server.

12. The mobile device of claim 11, wherein the transmitting the encrypted application data from the mobile device to the tunnel service server further comprises transmitting the encrypted application data in the one or more first data packets from the mobile device to the tunnel service server through the one or more relay service servers.

13. The mobile device of claim 12, wherein the transmitting the encrypted application data from the mobile device to the tunnel service server further comprises transmitting the encrypted application through a second firewall located between the one or more relay service servers and the mobile device.

14. The mobile device of claim 10, wherein the transmitting the encrypted application data comprises packaging the encrypted application data into packets according to a protocol for transmission to an external device.

15. A non-transitory machine-readable medium with a set of instructions stored thereon, which when executed, cause a mobile device to perform operations for establishing a secure internet protocol (IP) tunnel over a telecommunications network between the mobile device and a tunnel service server behind a firewall in an enterprise network, the operations comprising:
  transmitting, from the mobile device, a signaling request to a signaling service device in a enterprise network, the signaling service device being behind the enterprise firewall;
  receiving, at the mobile device, from the signaling service device a response, the response containing a first set of offered addresses of the tunnel service server, the first set of offered addresses allocated by one or more relay service servers;
  determining, at the mobile device, an optimal bearer path based at least upon the first set of offered addresses of the tunnel service server, the optimal bearer path associated with at least one of the offered addresses of the first set;

transmitting, from the mobile device, a connection request to the tunnel service server through the determined optimal bearer path, the connection request containing a second set of offered addresses of the mobile device to establish a connection to the tunnel service server;

establishing a secure tunnel over the determined optimal bearer path between the mobile device and the tunnel service server, the secure tunnel being through the one or more relay service servers that allocated the first set of offered addresses of the tunnel service server; and transmitting encrypted application data from the mobile device to the tunnel service server through the secure tunnel.

16. The medium of claim 15, wherein the encrypted application data remains encrypted from the mobile device to the tunnel service server, and the encrypted application data is packaged in one or more first data packets.

17. The medium of claim 16, wherein the transmitting the encrypted application data from the mobile device to the tunnel service server comprises transmitting unencrypted application data to an endpoint server.

18. The medium of claim 17, wherein the transmitting the encrypted application data from the mobile device to the tunnel service server further comprises transmitting the encrypted application data in the one or more first data packets from the mobile device to the tunnel service server through the one or more relay service servers.

19. The medium of claim 18, wherein the transmitting the encrypted application data from the mobile device to the tunnel service server further comprises transmitting the encrypted application through a second firewall located between the one or more relay service servers and the mobile device.

20. The medium of claim 16, wherein the transmitting the encrypted application data comprises packaging the encrypted application data into packets according to a protocol for transmission to an external device.

21. The medium of claim 16, wherein each of the one or more first data packets comprises a source address and a destination address.

* * * * *